US006768611B2

(12) United States Patent
Sato et al.

(10) Patent No.: US 6,768,611 B2
(45) Date of Patent: Jul. 27, 2004

(54) THIN FILM MAGNETIC HEAD CAUSING APPROPRIATELY SUPPRESSED SIDE FRINGING AND METHOD OF MANUFACTURING THE SAME

(75) Inventors: Kiyoshi Sato, Niigata-ken (JP); Toshinori Watanabe, Niigata-ken (JP); Hideki Gochou, Niigata-ken (JP); Kiyoshi Kobayashi, Niigata-ken (JP); Toru Takahashi, Niigata-ken (JP); Hisayuki Yazawa, Niigata-ken (JP); Masaki Ikegami, deceased, late of Niigata-ken (JP), by Hiromi Ikegami, Chiaki Ikegami, legal representatives

(73) Assignee: Alps Electric Co., Ltd., Tokyo (JP)

( * ) Notice: Subject to any disclaimer, the term of this patent is extended or adjusted under 35 U.S.C. 154(b) by 129 days.

(21) Appl. No.: 09/802,287

(22) Filed: Mar. 8, 2001

(65) Prior Publication Data

US 2002/0018317 A1 Feb. 14, 2002

(Under 37 CFR 1.47)

(30) Foreign Application Priority Data

Mar. 9, 2000 (JP) ........................................ 2000-065280

(51) Int. Cl.⁷ ............................................... G11B 5/127

(52) U.S. Cl. ....................................... 360/126; 360/122

(58) Field of Search ............................... 360/125, 126, 360/122

(56) References Cited

U.S. PATENT DOCUMENTS

| 5,452,164 A | | 9/1995 | Cole et al. | |
|---|---|---|---|---|
| 5,649,351 A | | 7/1997 | Cole et al. | |
| 5,652,687 A | | 7/1997 | Chen et al. | |
| 5,726,841 A | * | 3/1998 | Tong et al. | 360/122 |
| 5,802,700 A | | 9/1998 | Chen et al. | |
| 6,122,144 A | * | 9/2000 | Chang et al. | 360/122 |
| 6,330,127 B1 | * | 12/2001 | Sasaki | 360/126 |
| 6,337,783 B1 | * | 1/2002 | Santini | 360/317 |
| 6,388,845 B1 | * | 5/2002 | Sasaki | 360/317 |
| 6,483,664 B2 | * | 11/2002 | Kamijima | 360/126 |
| 2002/0105756 A1 | * | 8/2002 | Sasaki | 360/126 |

FOREIGN PATENT DOCUMENTS

| DE | 3818393 A | * | 12/1989 | ............ G11B/5/31 |
|---|---|---|---|---|
| JP | 03241510 A | * | 10/1991 | ............ G11B/5/31 |
| JP | 08287414 A | * | 11/1996 | ............ G11B/5/31 |
| JP | 09282609 A | * | 10/1997 | ............ G11B/5/31 |
| JP | 10-269523 | | 10/1998 | |
| JP | 2000048318 A | * | 2/2000 | ............ G11B/5/31 |

* cited by examiner

Primary Examiner—William Klimowicz
(74) Attorney, Agent, or Firm—Brinks Hofer Gilson & Lione

(57) ABSTRACT

In a thin film magnetic head, a face surface faces a recording medium and a front surface of an upper core layer is a curved surface which gradually retreats in a height direction generally perpendicular to the face surface as it approaches both sides thereof, and the thickness of the upper core layer gradually increases in the height direction. It is thus possible to appropriately suppress the occurrence of side fringing, efficiently cause a magnetic flux to flow from the upper core layer to an upper pole layer, and make the thin film magnetic head adaptable to a higher recording density.

24 Claims, 19 Drawing Sheets

SURFACE FACING RECORDING MEDIUM

THIN FILM MAGNETIC HEAD CAUSING APPROPRIATELY SUPPRESSED SIDE FRINGING AND METHOD OF MANUFACTURING THE SAME

BACKGROUND OF THE INVENTION

1. Field of the Invention

The present invention relates, generally, to a recording thin film magnetic head used as, for example, a flying magnetic head or the like and, more particularly, to a thin film magnetic head that is capable of appropriately decreasing side fringing, and that can be manufactured with high reproducibility, and a method of manufacturing the same.

2. Description of the Related Art

FIG. 24 is a partial front view showing the structure of a conventional thin film magnetic head (inductive head), and FIG. 25 is a partial cross-sectional view of the thin film magnetic head shown in FIG. 24.

In FIGS. 24 and 25, reference numeral 1 denotes a lower core layer made of a magnetic material such as permalloy or the like, with insulation layers 3 formed on both sides of the lower core layer 1. As shown in FIG. 24, a gap layer 4 and an upper pole layer 5 are formed with track width Tw on the lower core layer 1 to be exposed in the surface facing a recording medium. The gap layer 4 is formed to extent along the top of the lower core layer 1 to the position of contact between the lower core layer 1 and the base end 10b of an upper core layer 10 which will be described below, as shown in FIG. 25. On the other hand, the upper pole layer 5 is formed to extend to the top of a Gd determining layer 6 formed on the gap layer 4. The gap layer 4 is made of a nonmetallic insulating material, for example, $SiO_2$ or the like.

As shown in FIGS. 24 and 25, an insulation layer 7 is formed on both sides of the upper pole layer 5 in the track width direction (the X direction shown in the drawings) and on the back side in the height direction (the Y direction shown in the drawings). Furthermore, a coil layer 13 is patterned in a spiral shape on the insulation layer 7, and an insulation layer 9 made of an organic insulating material is formed on the coil layer 13 to cover the coil layer 13.

The upper core layer 10 is formed on the insulation layer 9, for example, by a frame plating method so that the front end 10a of the upper core layer 10 is magnetically connected to the upper pole layer 5 and exposed in the surface facing the recording medium. The base end 10b of the upper core layer 10 is magnetically connected to the lower core layer 1.

As shown in FIG. 24, the entire front surface 10c of the upper core layer 10 is exposed in the surface facing the recording medium.

Next, the method of manufacturing the thin film magnetic head shown in FIGS. 24 and 25 will be described below with reference to FIGS. 26 to 32. As shown in FIG. 26, the gap layer 4 made of an insulating material, for example, $SiO_2$ is formed over the entire surface of the lower core layer 1, and a resist layer 11 having a trench 11a having the track width Tw is formed on the gap layer 4. The trench 11a is formed with the predetermined length dimension from the surface facing the recording medium in the height direction (the Y direction shown in the drawing). Then, the upper pole layer 5 made of, for example, a NiFe alloy, is formed in the trench 11a by plating, and the resist layer 11 is removed.

As shown in FIG. 27, the width dimension of the upper pole layer 5, i.e., the track width Tw, is, for example, 0.45 $\mu$m, and the height dimension is about 3.5 to 3.8 $\mu$m. In FIG. 27, both sides of the upper pole layer 5 in the track width direction (the X direction shown in the drawing) are etched by ion milling (trimming step). As shown in FIG. 28, the portions of the gap layer 4 which protrude from the width dimension of the upper pole layer 5 in the track width direction are removed by the ion milling, and portions of the upper surface of the lower core layer 1 on both sides of the upper pole layer 5 are also removed to form a protrusion 1b and inclined surfaces 1a at the top of the lower core layer 1.

In FIG. 29, the insulation layer 7 of $Al_2O_3$ or the like is formed to cover both sides of the upper pole layer 5 and the upper pole layer 5 on the lower core layer 1, and polished to line A—A by a CMP technique or the like. FIG. 30 shows the state after polishing.

Next, the coil layer 13 and the insulation layer 9 shown in FIG. 25 are formed on the insulation layer 7, and then a resist layer 12 is formed on the insulation layers 7 and 9, and the upper pole layer 5, as shown in FIG. 31 (partial plan view). Then, a patterned portion 12a of the resist layer 12 is exposed and developed to remove the patterned portion 12a.

Then, a magnetic material is plated in the patterned portion 12a, and the resist layer 12 is removed to complete the upper core layer 10. FIG. 32 shows the structure of the tip portion of the thin film magnetic head.

The trimming step is usually carried out twice, the first trimming step comprising ion irradiation at an angle as close to a right angle as possible with the film plane direction of the lower core layer 1. In this step, the portions of the gap layer 4 on both sides of the bottom of the upper pole layer 5 are removed, and the lower core layer 1 formed below the gap layer 4 is also partially removed to form the protrusion 1b on the lower core layer 1. This step causes a problem in which the magnetic powder produced by cutting the gap layer 4 and the lower core layer 1 again adheres to the sides of the upper pole layer 5. Therefore, the second trimming step comprises ion irradiation in a direction more inclined that that in the first trimming step to remove the magnetic powder and, at the same time, to form the inclined surfaces 1a at the top of the lower core layer 1 on both sides of the upper pole layer 5.

However, in the structure of the thin film magnetic head shown in FIGS. 24 and 25, the front end surface 10c of the upper core layer 10 having a width dimension larger than the track width Tw is exposed in the surface facing the recording medium, and thus side fringing occurs due to a magnetic leakage between the upper core layer 10 and the upper pole layer 5, thereby causing the problem of decreasing the area recording density due to the occurrence of side fringing. Therefore, in order to manufacture a thin film magnetic head adaptable to a higher recording density in future, it is necessary to decrease the track width Tw and the occurrence of side fringing.

The method of manufacturing the thin film magnetic head shown in FIGS. 24 and 25 comprises the trimming step which causes variations in the track width Tw and the shape, and the problem of significantly decreasing the height of the upper pole layer 5. The reason for performing the trimming step is that in the state shown in FIG. 27, the gap layer 4 and the lower core layer 1 are formed to extend on both sides of the bottom of the upper pole layer 5, thereby easily causing the occurrence of side fringing between the upper pole layer 5 and the lower core layer 1. In the trimming, as shown in FIG. 28, the portions of the gap layer 4 which extend on both sides of the bottom of the upper pole layer 5 are removed, and the protrusion 1b and the inclined surfaces 1a are formed in the lower core layer 1 to increase the distance between the upper pole layer 5 and the lower core layer 1, whereby the occurrence of side fringing can be possibly appropriately decreased.

However, the trimming step causes a variation in the amount of the magnetic powder adhering to both sides of the upper pole layer 5 and a variation in removal of the magnetic powder, and a significant decrease in the height of the upper pole layer 5 because the first trimming step comprises ion irradiation in the direction as close to a right angle as possible with the film plane direction of the lower core layer 1. As a result, variations easily occur in the track width Tw and the shape of the upper pole layer 5, and the height dimension of the upper pole layer 5 is significantly decreased to cause a variation in the height dimension. Therefore, the trimming step deteriorates the reproducibility of the manufacture of the thin film magnetic head, and the volume of the upper pole layer 5 is decreased due to a decrease in the height dimension thereof, thereby easily bringing the upper pole layer 5 into a magnetic saturation state and deteriorating recording performance.

SUMMARY OF THE INVENTION

The present invention is aimed at solving the above problems of conventional thin film magnetic heads, and an object of the present invention is to provide a thin film magnetic head and a method of manufacturing the same which can appropriately prevent side fringing, and which can be manufactured with high reproducibility.

A thin film magnetic head of the present invention comprises a lower core layer, a recording core exposed at a face surface facing a recording medium and comprising one of (1) a lower pole layer, a gap layer and an upper pole layer, or (2) a gap layer and an upper pole layer, which are laminated in turn on the lower core layer. An upper core layer is magnetically connected to the upper pole layer of the recording core. A coil is provided for inducing a recording magnetic field in the lower core layer, the recording core and the upper core layer, wherein the front end surface of the upper core layer, which faces the recording medium side, has the shape of a curved surface so that the front surface gradually retreats in a height direction that is generally perpendicular to the face surface as it approaches both sides thereof in a track width direction that is generally parallel to the face surface.

In the present invention, the front surface of the upper core layer is formed in the shape of a curved surface so that the front surface gradually retreats in the height direction as it approaches both sides thereof in the track width direction. Therefore, unlike the conventional thin film magnetic head, the front surface of the upper core layer is not entirely exposed at the face surface, whereby the occurrence of side fringing can be appropriately prevented.

In addition, since the front surface of the upper core layer is formed in the shape of a curved surface in the track width direction, the occurrence of side fringing can be decreased as compared with the conventional thin film magnetic head even when the upper core layer is patterned on the upper pole layer at a position offset from a predetermined position with respect to the upper pole layer.

In the present invention, a line tangent to each of both termination points of the curved surface in the track width direction form an angle with the track width direction is preferably about 30° to about 60°.

The upper core layer preferably comprises a front region which extends in the height direction from the termination points of the curved front surface, and which has a constant width dimension in the track width direction. The upper core layer further includes a back region in which the width dimension in the track width direction gradually increases in the height direction from the termination points of the front region.

The front surface of the upper core layer may be located at a position displaced away from the face surface in the height direction. In this case, the front surface of the upper core layer is not exposed at the face surface.

Furthermore, as described above, the because front surface of the upper core layer is displaced away from the face surface in the height direction, the occurrence of side fringing can be prevented.

In the above-mentioned construction, the minimum distance L3 from the face surface to the front surface of the upper core layer is preferably smaller than the maximum length dimension of the recording core in the height direction from the face surface. The distance L3 is preferably about 0 $\mu$m<L3$\leq$ about 0.8 $\mu$m.

In the present invention, at least a portion of the front surface of the upper core layer may be located at the face surface. In the present invention, as described above, the front surface is formed in the shape of a curved surface so that the front surface gradually retreats in the height direction as it approaches both sides thereof in the track width direction. Therefore, unlike in the conventional thin film magnetic head, the front surface is only partially exposed in the face surface instead of entirely exposed.

In the construction of the present invention, the front surface of the upper core layer is preferably formed in a curved surface or an inclined surface so that the thickness of the upper core layer gradually increases in the height direction from the lower core layer side to the upper core layer side. In this way, the front end surface of the upper core layer is formed in a curved surface or an inclined surface so that the thickness of the upper core layer gradually increases in the height direction, thereby further decreasing the occurrence of side fringing, and facilitating a flow of a magnetic flux from the upper core layer to the upper pole layer. Therefore, a thin film magnetic head can be made with improved recording performance.

In the present invention, the upper core layer has a back surface that is located at a position behind the front end surface in the height direction, and that is formed in a curved surface or an inclined surface, such that the thickness between the lower core layer and the upper core layer gradually increases in the height direction.

Assuming that the inclination angle $\theta 1$ of the inclined surface formed in the back surface with respect to the height direction, or the inclination angle of a line tangent to the curved surface at an intermediate point between with a termination point at the magnetic core and with respect to the height direction a termination point at an underside of the upper core layer, and that the inclination angle $\theta 2$ of the inclined surface formed as the front surface of the upper core layer with respect to the height direction, or the inclination angle of a line tangent to the curved surface at an intermediate point between a termination point at the magnetic core and a termination point at the upper surface of the upper core layer with the height direction, $\theta 2$ is preferably larger than $\theta 1$.

In this construction, a magnetic flux from the upper core layer can be efficiently caused to flow to the upper pole layer to permit an attempt to improve the recording performance. The inclination angle $\theta 2$ is preferably about $60° \leq \theta 2 <$ about $90°$.

In the present invention, the width dimension of the end of the upper core layer, which is connected to the upper pole layer, in the track width direction is preferably larger than the width dimension of the upper pole layer in the track width direction. This construction permits an efficient flow of a magnetic flux from the upper core layer to the upper pole layer, thereby permitting an attempt to improve the recording performance.

In the present invention, the recording core preferably comprises a front region that extends from the face surface in the height direction and that has a constant width dimension in the track width direction, and a back region in which the width dimension in the track width direction gradually increases in the height direction beginning from a terminal portion of the front region By forming the back region having a larger track width Tw, the contact area between the recording core and the upper core layer can be increased.

The upper core layer is preferably connected to at least the back region of the recording core so that a magnetic flux from the upper core layer can be efficiently caused to flow to the upper pole layer.

In the present invention, the gap layer is preferably made of a platable nonmagnetic metal material. In this case, as the nonmagnetic metal material, at least one material is preferably selected from NiP, NiPd, NiW, NiMo, Au, Pt, Rh, Pd, Ru, and Cr. A method of manufacturing a thin film magnetic head having a face surface that faces a recording medium comprising the steps of:

(a) carrying our a process of one of (1) sequentially laminating in turn a lower pole layer, a gap layer and an upper pole layer such that a lateral dimension of the lower pole layer and the upper pole layer in a track width direction, wherein the track width direction is a direction substantially parallel to the face surface is determined at the face surface, or (2) sequentially laminating in turn a gap layer and an upper pole layer such that the lateral dimension of the upper pole layer in the track width direction is determined at the face surface, to form a recording core;

(b) before or after step (a) forming an insulation layer around the recording core, and grinding the insulation layer so that the upper surfaces of the recording core and the insulating lay lie in substantially the same plane;

(c) forming a resist layer on the recording core and the insulation layer;

(d) forming an upper core layer pattern for in the resist layer such that a front surface of the upper core layer pattern is in proximity to the face surface and has a curved surface which gradually retreats in the height direction as it approaches side surfaces of the upper core layer pattern in the track width direction; and (e) plating a magnetic material in the pattern to form the upper core layer having a curved front surface conforming to the upper core layer pattern.

In the present invention, step (d) comprises exposing a portion of the resist layer other than the upper core layer pattern and developing the portion to form one of an inclined surface or a curved surface at the front surface of the upper core layer pattern, such that the front surface gradually retreats in the height direction as it approaches a top surface thereof, and which is partially located at the same position as the face surface.

In the step (e), at least a portion of forming an inclined surface or curved surface at the front surface of the upper core layer such that at least a portion of the front surface is located at the face surface, and the front end surface gradually retreats in the height direction as it approaches an upper surface of the upper core layer in the track width direction.

In the present invention, the gap layer is preferably made of a platable nonmagnetic metal material. Specifically, the nonmagnetic metal material comprises at least one material preferably selected from the group consisting of NiP, NiPd, NiW, NiMo, Au, Pt, Rh, Pd, Ru, and Cr.

The manufacturing method of the present invention can manufacture a thin film magnetic head with high reproducibility and little variation in the track width Tw and height dimension of the recording core, and can easily form a thin film magnetic head capable of suppressing the occurrence of side fringing.

In exposure and development of the resist layer used for forming the pattern of the upper core layer, the portion of the resist layer other than the pattern is irradiated with light and then developed to form the inclined surface or curved surface at the front surface of the pattern. The front surface gradually retreats in the height direction as it approaches the top thereof. As a result, the front surface of the upper core layer formed in the pattern can be formed as an inclined surface or curved surface, so that the thickness of the upper core layer increases in the height direction as it approaches the top the upper core layer.

DESCRIPTION OF THE PREFERRED EMBODIMENTS

Figure 1:
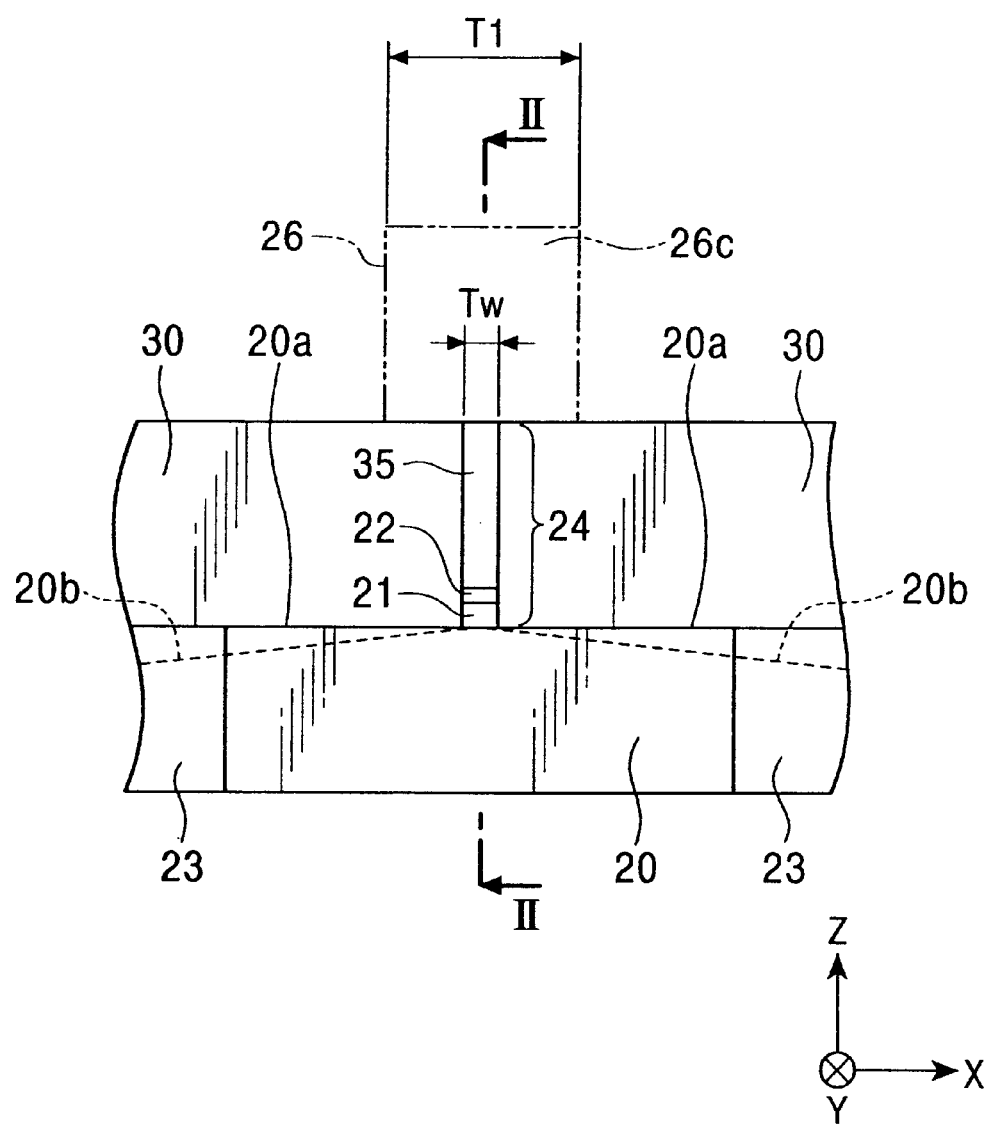
FIG. 1 is a partial front view showing the structure of a thin film magnetic head in accordance with an embodiment of the present invention.
Figure 2:
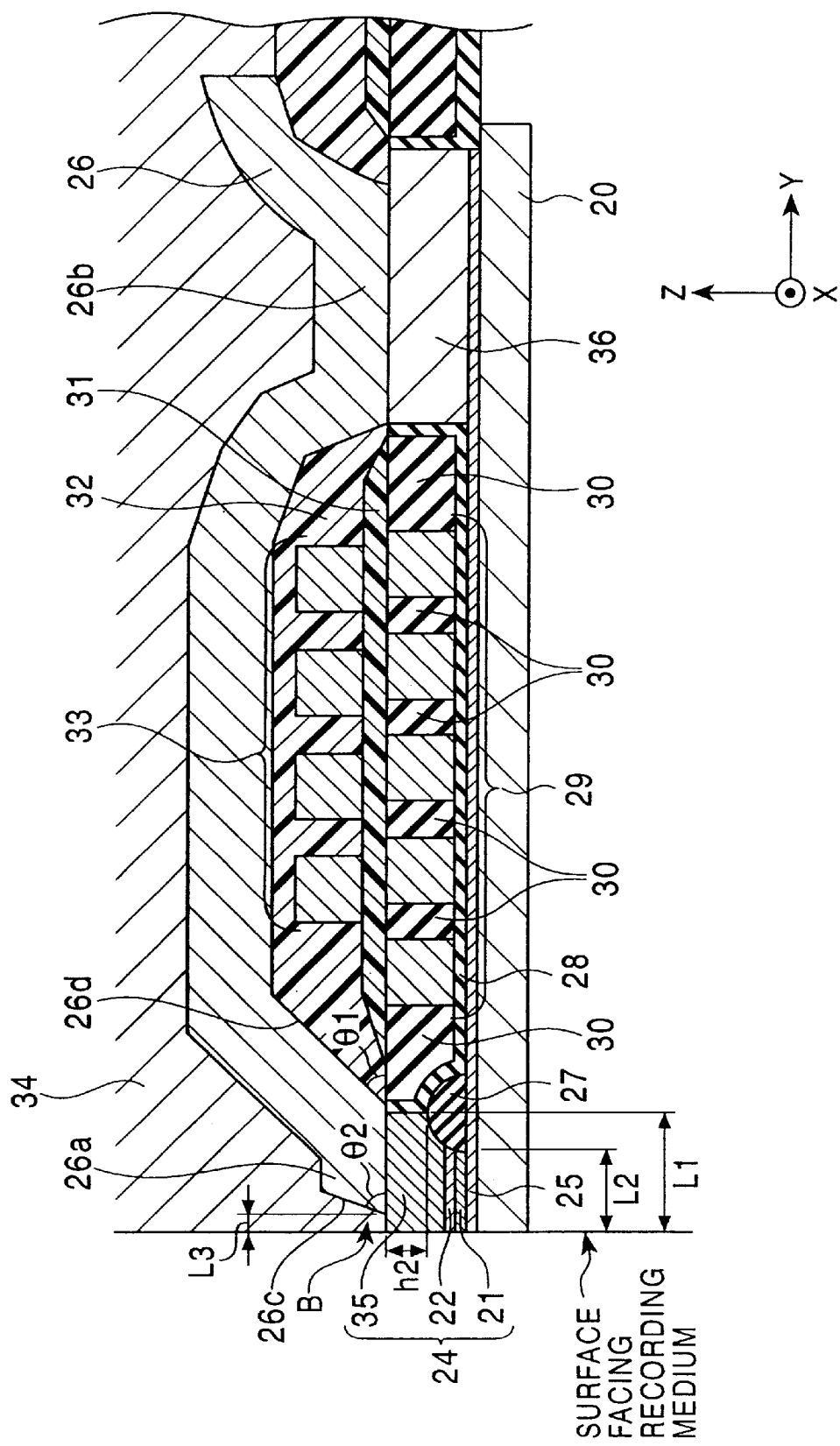
FIG. 2 is a partial cross-sectional view of the thin film magnetic head taken along line II—II in FIG. 1.
Figure 3:
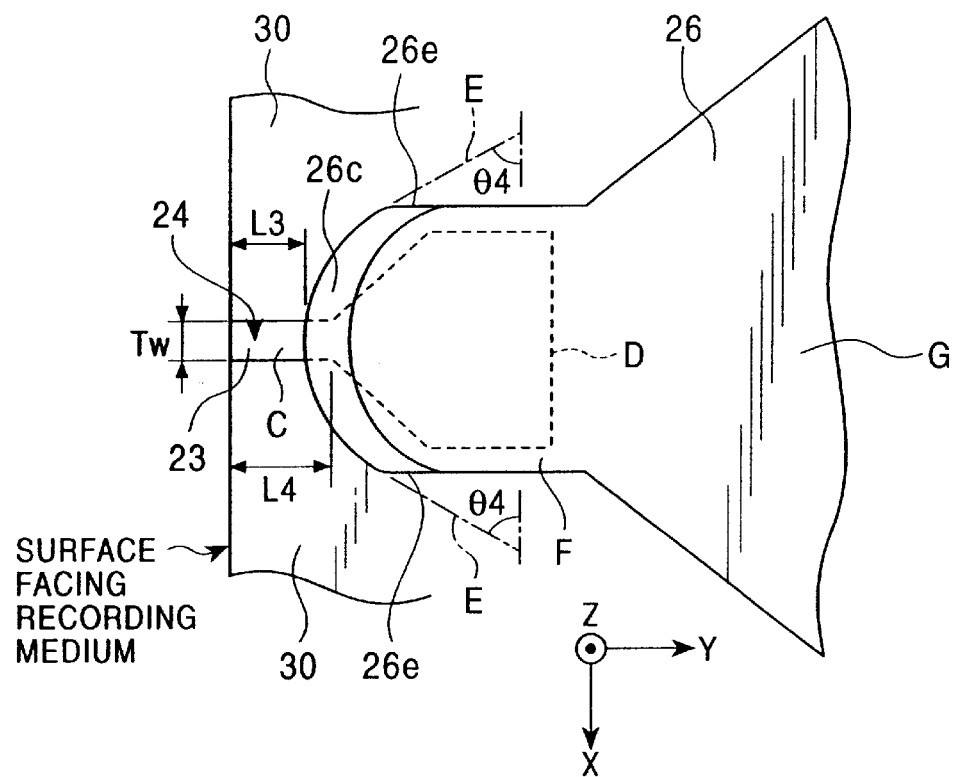
FIG. 3 is a partial plan view of the thin film magnetic head shown in FIGS. 1 and 2.
Figure 4:
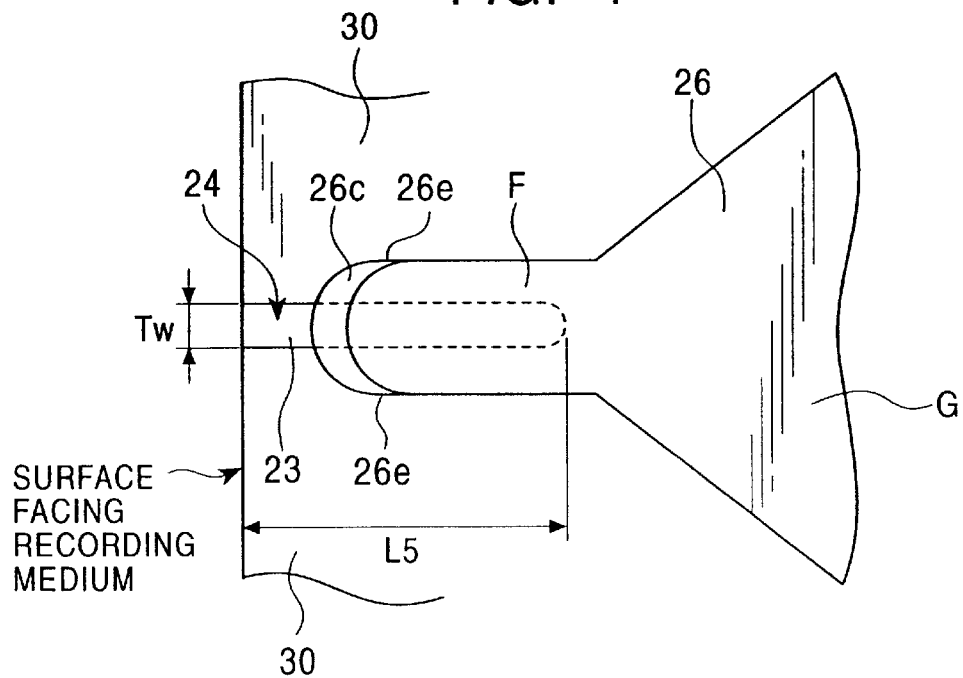
FIG. 4 is a partial plan view showing another example of the shape of the thin film magnetic head shown in FIGS. 1 and 2.

FIG. 1 a partial front view showing the structure of a thin film magnetic head in accordance with an embodiment of the present invention, and FIG. 2 is a partial cross-sectional view of the thin film magnetic head taken along line II—II in FIG. 1 as viewed from an arrow direction. FIGS. 3 and 4 are partial plan views showing embodiments of the shape of the thin film magnetic head of the present invention.

Although the thin film magnetic head shown in FIG. 1 is a recording inductive head, a reproducing head (MR head) using a magnetoresistive effect may be laminated below the inductive head of the present invention. In FIGS. 1 and 2, reference numeral 20 denotes a lower core layer made of a magnetic material, for example, permalloy or the like. In the case in which the reproducing head is laminated below the lower core layer 20, a shield layer may be provided separately from the lower core layer 20, for protecting a magnetoresistive element from noises, or the lower core layer 20 may be used as an upper shield layer of the reproducing head without the shield layer.

As shown in FIG. 1, insulation layers 23 are formed on both sides of the lower core layer 20. As shown in FIG. 1, the upper surface 20a of the lower core layer 20, which extends from the base end of a lower pole layer 21 described below, may be formed to extend in parallel to the track width direction, which is a direction that is generally parallel to the surface facing the recording medium, or the face surface (the X direction shown in the drawing), or inclined surfaces 20b inclined in the direction away from an upper core layer 26 may be formed. By forming the inclined surfaces 20b at the top of the lower core layer 20, the occurrence of side fringing can be appropriately decreased.

As shown in FIGS. 1 and 2, a recording core 24 is formed on the lower core layer 20 to be exposed at the surface facing a recording medium of the face surface. In this embodiment, the recording core 24 serves as a so-called track width regulating portion, which is formed with the track width Tw. The track width Tw is preferably 0.7 $\mu$m or less, and more preferably 0.5 $\mu$m or less.

In the embodiment shown in FIGS. 1 and 2, the recording core 24 has a laminated structure comprising a three layer film including a lower pole layer 21, a gap layer 22, and an upper pole layer 35. The pole layers 21 and 35, and the gap layer 22 will be described below.

As shown in FIGS. 1 and 2, the lower pole layer 21 is formed, by plating, as the lowermost layer of the recording core 24 on the lower core layer 20. The lower pole layer 21 is magnetically connected to the lower core layer 20, and made of -a material which may be the same as or different from the lower core layer 20. The lower pole layer 21 may comprise a single layer film or a multilayer film. The height dimension of the lower pole layer 21 is, for example, about 0.3 $\mu$m.

As shown in FIGS. 1 and 2, the nonmagnetic gap layer 22 is laminated on the lower pole layer 21. In the present invention, the gap layer 22 is preferably made of a nonmagnetic metal material, and formed on the lower pole layer 21 by plating. In the present invention, the nonmagnetic metal material preferably comprises at least one material selected from NiP, NiPd, NiW, NiMo, NiRh, Au, Pt, Rh, Pd, Ru, and Cr. The gap layer may comprise a single layer film or a multilayer film. The height dimension of the gap layer 22 is, for example, about 0.2 $\mu$m.

The upper pole layer 35 is formed on the gap layer 22 to be magnetically connected to the upper core layer 26 which will be described below. The upper pole layer 35 is made of a material which may be the same as or different from the upper core layer 26. The upper pole layer 35 may comprise a single layer film or a multilayer film. The height dimension of the upper pole layer 35 is, for example, about 2.4 to 2.7 $\mu$m.

With the gap layer 22 made of a nonmagnetic metal material, the lower pole layer 21, the gap layer 22 and the upper pole layer 35 can be continuously formed by plating.

In the present invention, the structure of the recording core 24 is not limited to the laminated structure comprising the tree layer film. The recording core 24 may comprise a two layer film including the gap layer 22 and the upper pole layer 35.

As described above, the lower pole layer 21 and the upper pole layer 35 are made of materials that may be the same or different from the core layers to which both pole layers are respectively magnetically connected. However, in order to improve the recording density, the lower pole layer 21 and the upper pole layer 35 opposed to the gap layer 22 preferably have higher saturation magnetic flux densities than those of the core layers to which both pole layers are respectively magnetically connected. In this way, the lower pole layer 21 and the upper pole layer 35 have higher saturation magnetic flux densities, whereby a recording magnetic field can be concentrated in the vicinity of the gap to improve the recording density.

As shown in FIG. 2, a plating base layer 25 is formed between the lower pole layer 21 and the lower core layer 20. As shown in FIG. 2, the recording core 24 is formed with length dimension L1 from the face surface (ABS) in the height direction which is a direction that is generally perpendicular to the face surface (the Y direction shown in the drawing).

As further shown in FIG. 2, a Gd determining insulation layer 27 made of, for example, resist or the like is formed on the lower core layer 20 so as to have, for example, a curved surface. As shown in FIG. 2, the upper pole layer 35 is formed to extend to the curved surface.

As shown in FIG. 2, the height dimension h2 of the upper pole layer 35 from the top of the Gd determining insulation layer 27 is, for example, about 1.4 to 1.7 $\mu$m. In a conventional thin film magnetic head, the height dimension is smaller than h2, and thus the upper pole layer cannot gain volume. However, in the present invention, the upper pole layer 35 can be formed with the height dimension h2, thereby increasing the volume of the upper pole layer 35.

The reason for this is that the present invention makes unnecessary the step of trimming perpendicularly to the film plane of the lower core layer 20, as described below in the manufacturing method.

By forming the upper pole layer 35 on the Gd determining insulation layer 27, the length dimension L1 of the upper pole layer 35 can be increased to further gain the volume of the upper pole layer 35. Therefore, even in high density recording, the magnetic saturation of the upper pole layer 35 can be decreased to permit an attempt to improve the recording performance.

As shown in FIG. 2, the length dimension L2 from the front surface of the Gd determining insulation layer 27 to the surface facing the recording medium is regulated as gap depth Gd, which is set to the predetermined length because it significantly affects the electric properties of the thin film magnetic head. In the embodiment shown in FIG. 2, the gap depth Gd is regulated by the position where the Gd determining insulation layer 27 is formed on the lower core layer 20.

As shown in FIG. 2, a coil layer 29 is spirally formed overlying the lower core layer 20 in a region behind the recording core 24 in the height direction (the Y direction shown in the drawing), with the plating base layer 25 and an insulating base layer 28 provided therebetween. The insulating base layer 28 is preferably made of, for example, at least one insulating material selected from AlO, $Al_2O_3$, $SiO_2$, $Ta_2O_5$, TiO, AlN, AlSiN, TiN, SiN, $Si_3N_4$, NiO, WO, $WO_3$, BN, CrN, and SiON.

The pitch intervals of a conductor of the coil layer 29 are filled with an insulation layer 30. The insulation layer 30 is preferably made of at least one insulating material selected from AlO, $Al_2O_3$, $SiO_2$, $Ta_2O_5$, TiO, AlN, AlSiN, TiN, SiN, $Si_3N_4$, NiO, WO, $WO_3$, BN, CrN, and SiON.

As shown in FIG. 1, the insulation layer 30 is formed on both sides of the recording core 24 in the track width direction (the X direction shown in the drawing) so as to be exposed at the surface facing the recording medium.

As shown in FIG. 2, an insulation layer 31 made of an organic insulating material, such as resist, polyamide, or the like is formed on the insulation layer 30, and a second coil layer 33 is spirally formed on the insulation layer 31. As shown in FIG. 2, the second coil layer 33 is covered with an insulation layer 32 made of an organic insulating material such as resist, polyamide, or the like, and the upper core layer 26, made of a NiFe alloy or the like is patterned on the insulation layer 32 by, for example, a frame plating method or the like.

As shown in FIG. 2, the front end 26a of the upper core layer 26 is magnetically connected to the upper pole layer 35, and the base end 26b of the upper core layer 26 is magnetically connected to a lifting layer 36 formed on the lower core layer 20 by using a magnetic material, such as a NiFe alloy or the like. The lifting layer 36 is optional and may not be formed. Without the lifting layer 36, the base end 26b of the upper core layer 26 is connected directly to the lower core layer 20 through the plating base layer 25.

Although the thin film magnetic head shown in FIG. 2 comprises two coil layers, one coil layer may be formed. In this case, for example, the portion on the lower core layer 20, which is behind the recording core 24 in the height direction, is filled with the insulation layer 30, and the coil layer is formed on the insulation layer 30. Alternatively, the upper core layer 26 is formed on the insulation layer 31 without the second coil layer 33 shown in FIG. 2.

In the present invention, as shown in FIGS. 1 and 2, the front end surface 26c of the upper core layer 26 is located behind the face surface in the height direction (the Y direction shown in the drawings) and is not exposed at the face surface. Also, in the present invention, the front end surface 26c of the upper core layer 26 is located behind the face surface in the height direction, and thus the occurrence of side fringing can be appropriately decreased.

As shown in FIG. 1, the front surface 26a of the upper core layer 26 has width dimension T1 in the track width direction (the X direction shown in the drawing), the dimension T1 being larger than the track width Tw. Therefore, if, as in the prior art, the front surface 26c of the upper core layer 26 were exposed at the face, side fringing could easily occur due to a leakage magnetic flux between the upper core layer 26 and the upper pole layer 35, thereby failing to manufacture a thin film magnetic head adaptable to a higher recording density in future. In the present invention, therefore, as described above, the front surface 26c of the upper core layer 26 is located behind the face surface in the height direction so as not to be exposed at the surface facing the recording medium. It is thus possible to appropriately prevent the occurrence of side fringing between the upper core layer 26 and the upper pole layer 35 exposed at the surface facing the recording medium, and manufacture a thin film magnetic head adaptable to a higher recording density in future.

As shown in FIGS. 2 and 3, the minimum distance L3 between the surface facing the recording medium and the front surface 26c of the upper core layer 26 is not more than the maximum length dimension (=L1) of the recording core from the face surface in the height direction, and is preferably about 0 $\mu$m<L3≦ about 0.8 $\mu$m. By setting the distance L3 to about 0.8 $\mu$m or less, the magnetic flux of the upper core layer 26 can be caused to flow into the upper pole layer 35 with less loss.

As shown in FIG. 2, the front surface 26c of the upper core layer 26 is an inclined surface so that the thickness of the upper core layer 26 gradually increases in the height direction (the Y direction). Alternatively, the front surface 26c is formed into a curved surface so that the thickness of the upper core layer 26 gradually increases in the height direction. In particular, the inclination angle θ2 of the front end surface 26c with respect to the height direction (the Y direction), or in the case of the curved front end surface 26c, the inclination angle θ2 of the line tangent to the curved surface at an intermediate point between the termination point at the magnetic core 24 and a termination point at an upper surface of the upper core layer with respect to the height direction is smaller than at least about 90°.

An inclination angle θ2 of about 90° or less has the following advantage. As shown in FIG. 2, the upper core layer 26 is covered with a protecting layer 34 made of an insulating material, for example, $Al_2O_3$ or the like, and with the inclination angle θ2 of about 90° or less, the distance between the front end 26a of the upper core layer 26 and the face surface can be completely filled with the protecting layer 34 without forming a cavity.

Although the inclination angle θ2 of the front surface 26c of the upper core layer 26 is preferably 90° or less, there is a lower limit of the inclination angle. In the present invention, the upper core layer 26 has a back surface 26d opposite to the front surface 26c, which is formed into a curved surface or an inclined surface so that the thickness between the lower core layer side and the upper core layer side gradually increases in the height direction. Assuming that the inclination angle of the inclined surface with respect to the height direction or the inclination angle of the line tangent to the curved surface at an intermediate point between a termination point at the magnetic core 24 and a termination point at an undesirable of the upper core layer with respect the height direction is θ1, the inclination angle θ2 is preferably larger than the inclination angle θ1. In this way, where the inclination angle θ2 of the front surface 26c is larger than the inclination angle θ1 of the back surface 26d of the upper core layer 26, the magnetic flux from the upper core layer 26 can be efficiently caused to flow to the upper pole layer 35, thereby permitting an attempt to improve the recording performance.

In the present invention, the inclination angle θ2 of the front surface 26c is preferably in the range of about 60°≦θ2<about 90°. With the inclination angle θ2 of less than about 60°, the front end 26a of the upper core layer 26 is significantly tapered to decrease the volume of the front end 26a, thereby easily deteriorating the transmission efficiency of the magnetic flux from the upper core layer 26 to the upper pole layer 35.

In the case in which the front surface 26c is formed into a curved surface so that the thickness of the upper core layer 26 gradually increases in the height direction, the curved surface may be formed into a convex shape or a concave shape.

As shown in FIG. 3, the front surface 26c of the upper core layer 26 is formed in the shape of a curved surface so that the front surface 26c gradually retreats in the height direction as it approaches both sides in the track width direction. The front surface 26c of the upper core layer 26 is formed in the shape of a curved surface, not in a conventional planar shape, in the track width direction, whereby the leakage magnetic flux between the upper core layer 26 and the upper pole layer 35 can be further decreased to further decrease the occurrence of side fringing.

Where the front surface 26c of the upper core layer 26 is formed in the shape of a curved surface in the track width direction, even when the formation position of the upper core layer 26 relative to the upper pole layer 35 is slightly shifted in the track width direction (the X direction), the effect of side fringing can be decreased as compared with the case in which the front surface 26c is formed in a planar shape in the track width direction. It is thus possible to manufacture a thin film magnetic head in which the occurrence of side fringing can be appropriately decreased even when the precision of alignment of the upper core layer 26 with the upper pole layer 35 is slightly decreased.

In the present invention, assuming that the line tangent to each of the termination points 26e of the curved surface in the track width direction is a virtual line E, the inclination angle θ4 of the virtual line E with respect to the track width direction (the X direction) is preferably about 30° to about 60°.

By setting the inclination angle θ4 to about 30° to about 60°, even when the front surface 26c of the upper core layer 26 is formed at substantially the same position as the surface facing the recording medium, the occurrence of side fringing can be appropriately suppressed without decreasing the transmission efficiency of the magnetic flux flowing from the upper core layer 26 to the upper pole layer 35.

As shown in FIG. 3, the upper core layer 26 comprises a front region F which extends from the termination points 26e of the curved front surface 26c in the height direction and which has a constant width dimension in the track width direction, and a back region G which starts from the terminal of the front region F and has a width dimension in the track width direction that gradually increases in the height direction (the Y direction). However, the shape of the upper core layer 26 is not limited to this arrangement. For example, the front region F may be formed so that the width dimension increases along the virtual lines E in the height direction.

As described above, in the thin film magnetic head shown in FIGS. 1 and 2, the front end 26a of the upper core layer 26 is formed to retreat from the face surface in the height direction, and the front surface 26c of the upper core layer 26 is formed into an inclined surface or curved surface so that the thickness (the Z direction) of the upper core layer 26 gradually increases in the height direction. Also, the front surface 26c is formed in the shape of a curved surface so that it gradually retreats in the height direction as it approaches both ends in the track width direction.

FIG. 3 shows that the end of the upper core layer 26 joined to the upper pole layer 35 has a width dimension larger than that of the upper pole layer 35 in the track width direction. As a result, the magnetic flux from the upper core layer 26 can be efficiently caused to flow to the upper pole layer 35 to permit an attempt to improve the recording performance.

In the present invention, in the portion where the upper core layer 26 and the recording core 24 overlap each other, the width dimension of the upper core layer 26 in the track width direction is preferably about 2 to about 2.5 times the width dimension of the recording core 24 in the track width direction. Within this range, in forming the upper core layer 26 on the recording core 24, the top of the recording core 24 can easily securely be overlapped with the upper core layer 26 within the width dimension thereof, and the magnetic flux from the upper core layer 26 can be efficiently caused to flow to the upper pole layer 35.

As shown in FIG. 3, the recording core 24 comprises a front end region C formed with the track width Tw in the height direction (The Y direction shown in the drawing) from the surface facing the recording medium, and a back region D which starts from the terminal of the front region C in the height direction and which has a width dimension in the track width direction gradually increasing in the height direction.

Since the recording core 24 comprises the back region D having a width dimension larger than the track width Tw, the contact area with the upper core layer 26 can be increased, and the magnetic flux from the upper core layer 26 can be efficiently caused to flow to the upper pole layer 35. Therefore, the upper core layer 26 formed on the recording core 24 is preferably joined to at least the back region D of the recording core 24, because the contact area between the upper core layer 26 and the recording core 24 can be increased.

In the present invention, the length dimension L4 of the front region C formed with the track width Tw is preferably in the range of about 0.2 $\mu$m<L4$\leq$about 3.0 $\mu$m. With the length dimension L4 less than the foregoing range, the length dimension of the front region C of the recording core 24 becomes excessively short, thereby causing difficulty in regulating the width dimension of the recording core 24 exposed at the face surface by the predetermined track width Tw. On the other hand, with the length dimension L4 longer than the foregoing range, the upper core layer 26 less overlaps the back region D of the recording core 24, while the upper core layer 26 greatly overlaps the front region C of the recording core 24, thereby failing to utilize the advantage of increasing the contact area between the upper core layer and the upper pole layer 35.

FIG. 4 is a partial plan view showing another embodiment of the shape of the recording core of the thin film magnetic head of the present invention. As shown in FIG. 4, the recording core 24 is formed with the track width Tw and the predetermined length dimension L5, which is measured from the face surface in the height direction (the Y direction shown in the drawing). In the embodiment shown in FIG. 4, unlike in the embodiment shown in FIG. 3, the recording core 24 does not have the back region D. In the shape of the recording core 24 shown in FIG. 4, the contact area with the upper core layer 26 is decreased as compared with the shape of the recording core 24 shown in FIG. 3. However, there is the advantage that the track width Tw can be appropriately regulated.

The length dimension L5 of the recording core 24 is preferably in the range of about 0.8 $\mu$m$\leq$L5$\leq$about 6.0 $\mu$m. With the length dimension L5 of about 0.8 $\mu$m or more, the sufficient contact area between the upper core layer 26 and the upper pole layer 35 can be obtained, and thus the transmission efficiency of the magnetic flux flowing from the upper core layer 26 to the upper pole layer 35 is not decreased. With the length dimension L5 of 6.0 $\mu$m or more, each of the layers of the recording core 24 cannot be uniformly formed by plating to cause a tapered portion or curved portion at the internal end of each of the layers, which undesirably causes great variations in the magnetic gap and the gap depth Gd.

Like the embodiment of FIG. 3, in the embodiment shown in FIG. 4, the end of the upper core layer 26, which is joined to the upper pole layer 35, has a width dimension in the track width direction larger than the width dimension of the upper pole layer 35, whereby the magnetic flux from the upper core layer 26 can be efficiently caused to flow to the upper pole layer 35. In the embodiment shown in FIG. 4, the area ratio between the overlap portions of the upper core layer 26 and the recording core 24 and the shape of the upper core layer 26, etc. are the same as the embodiment shown in FIG. 3.

Figure 5:
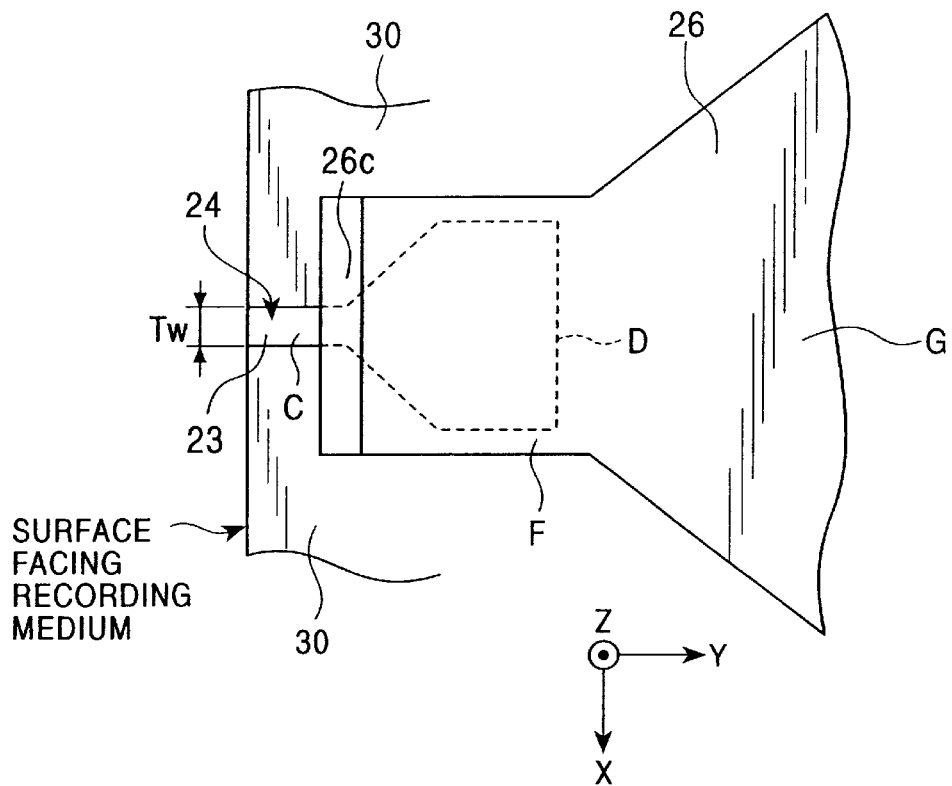
FIG. 5 is a partial plan view showing still another example of the shape of the thin film magnetic head shown in FIGS. 1 and 2.
Figure 6:
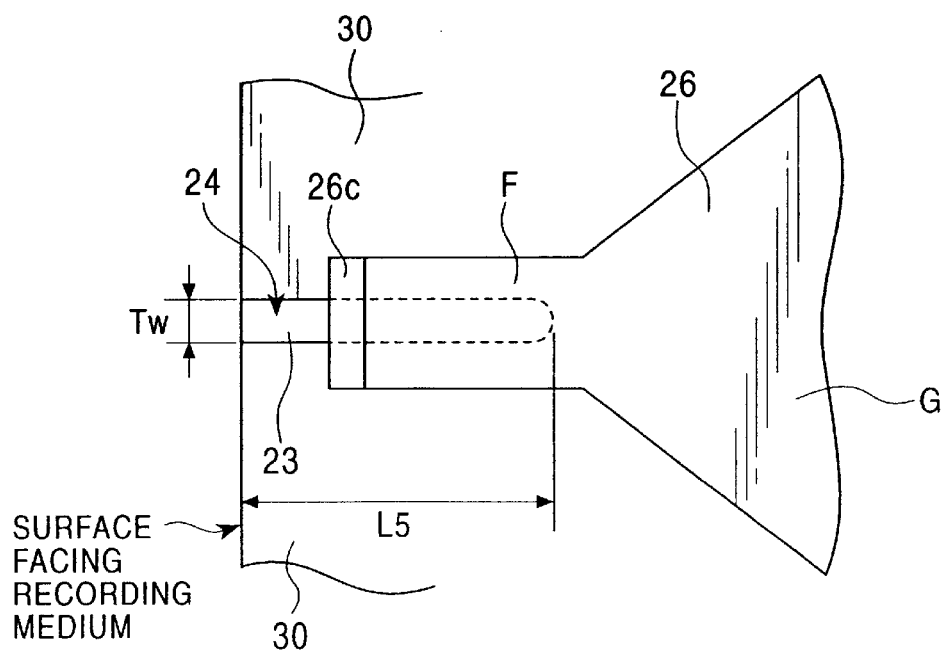
FIG. 6 is a partial plan view showing a further example of the shape of the thin film magnetic head shown in FIGS. 1 and 2.

FIGS. 5 and 6 are partial plan views showing other embodiments of the thin film magnetic head of the present invention. Like in the embodiment shown in FIG. 3, in the embodiment of FIG. 5, the upper core layer 26 is formed to retreat from the surface facing the recording medium in the height direction (the Y direction shown in the drawing) so that the front surface 26c of the upper core layer 26 is not exposed at the face surface. The space between the face surface and the front surface 26c of the upper core layer 26 is filled with the protecting layer 34 shown in FIG. 2.

Like in the thin film magnetic head shown in FIG. 2, in the thin film magnetic head shown in FIG. 5, the front surface 26c of the upper core layer 26 is an inclined surface or a curved surface so that the thickness of the upper core layer 26 gradually increases in the height direction (the Y direction shown in the drawing). In this way, the upper core layer 26 is formed to retreat from the face surface in the height direction, and the front surface 26c of the upper core layer 26 is an inclined surface or curved surface so that the thickness of the upper core layer 26 gradually increases in the height direction. It is thus possible to appropriately decrease the occurrence of side fringing between the upper core layer 26 and the upper pole layer 35, efficiently cause the magnetic flux to flow from the upper core layer 26 to the upper pole layer 35, and completely fill the space between the front surface 26c of the upper core layer 26 and the face surface with the protecting layer 34 without forming cavities.

Unlike in the embodiments shown in FIGS. 3 and 4, in the embodiment shown in FIG. 5, the front surface 26c of the upper core layer 26 is formed in a planar shape extending parallel to the track width direction (the X direction shown in the drawing). In the embodiment shown in FIG. 5, to form a structure effective for suppressing the occurrence of side fringing, the front surface 26c of the upper core layer 26 is formed in a planar shape in the track width direction, and the front surface 26c is formed to retreat from the face surface in the height direction (the Y direction shown in the drawing) so that the front surface 26c is not exposed at the surface facing the recording medium.

In the embodiment shown in FIG. 5, the shape of the recording core 24 below the upper core layer 26 is the same as the recording core 24 shown in FIG. 3. In particular, the recording core 24 comprises a front region C formed with the track width Tw in the height direction (the Y direction shown in the drawing) from the face surface, and a back region D in which the width dimension in the track width direction gradually increases in the height direction from the terminal of the front region C. By forming the back region D having a width dimension larger than the track width Tw, the contact area between the upper pole layer 35 and the upper core layer 26 can be increased.

As further shown in FIG. 5, the end of the upper core layer 26, which is joined to the upper pole layer 35, has a width dimension in the track width direction larger than the width dimension of the upper pole layer 35, whereby the magnetic flux from the upper core layer 26 can be efficiently caused to flow to the upper pole layer 35 to permit an attempt to improve the recording performance.

FIG. 6 is a partial plan view showing a further embodiment of the thin film magnetic head. Like the embodiment of FIG. 5, in the embodiment shown in FIG. 6, the upper core layer 26 retreats from the face surface in the height direction (the Y direction shown in the drawing), and the front surface 26c of the upper core layer 26 is an inclined surface or curved surface so that the thickness of the upper core layer 26 gradually increases in the height direction. It is thus possible to decrease the occurrence of side fringing, appropriately fill the space between the front end surface 26c of the upper core layer 26 and the surface facing the recording medium with the protecting layer 34, and efficiently cause the magnetic flux to flow from the upper core layer 26 to the upper pole layer 35, as compared with a conventional thin film magnetic head.

Like in the embodiment of FIG. 5, in the embodiment shown in FIG. 6, the front end surface 26c of the upper core layer 26 is formed in a planar shape parallel to the track width direction (the X direction shown in the drawing). However, even in this shape, the upper core layer 26 retreats from the face surface in the height direction, thereby decreasing the occurrence of side fringing as compared with a conventional thin film magnetic head.

In the embodiment shown in FIG. 6, the recording core 24 is formed with the track width Tw and the predetermined length dimension L5 measured from face the surface in the height direction. Where the recording core 24 is formed only with a width dimension corresponding to the track width Tw, the track width Tw can easily be regulated within the predetermined dimension range.

In the embodiment shown in FIG. 6, the end of the upper core layer 26, which is joined to the upper pole layer 35, has a width dimension in the track width direction that is larger than the width dimension of the upper pole layer 35. Accordingly, the magnetic flux from the upper core layer 26 can be efficiently caused to flow to the upper pole layer 35 to permit an attempt to improve the recording performance.

Although, in the embodiment shown in FIGS. 5 and 6, the upper core layer 26 comprises a front region F having a constant width dimension, and a back region G in which the width dimension in the track width direction gradually increases in the height direction from the terminal end of the front region F in the height direction, the upper core layer may have another shape. For example, the front region F may be formed so that the width dimension gradually increases in the height direction.

Figure 7:
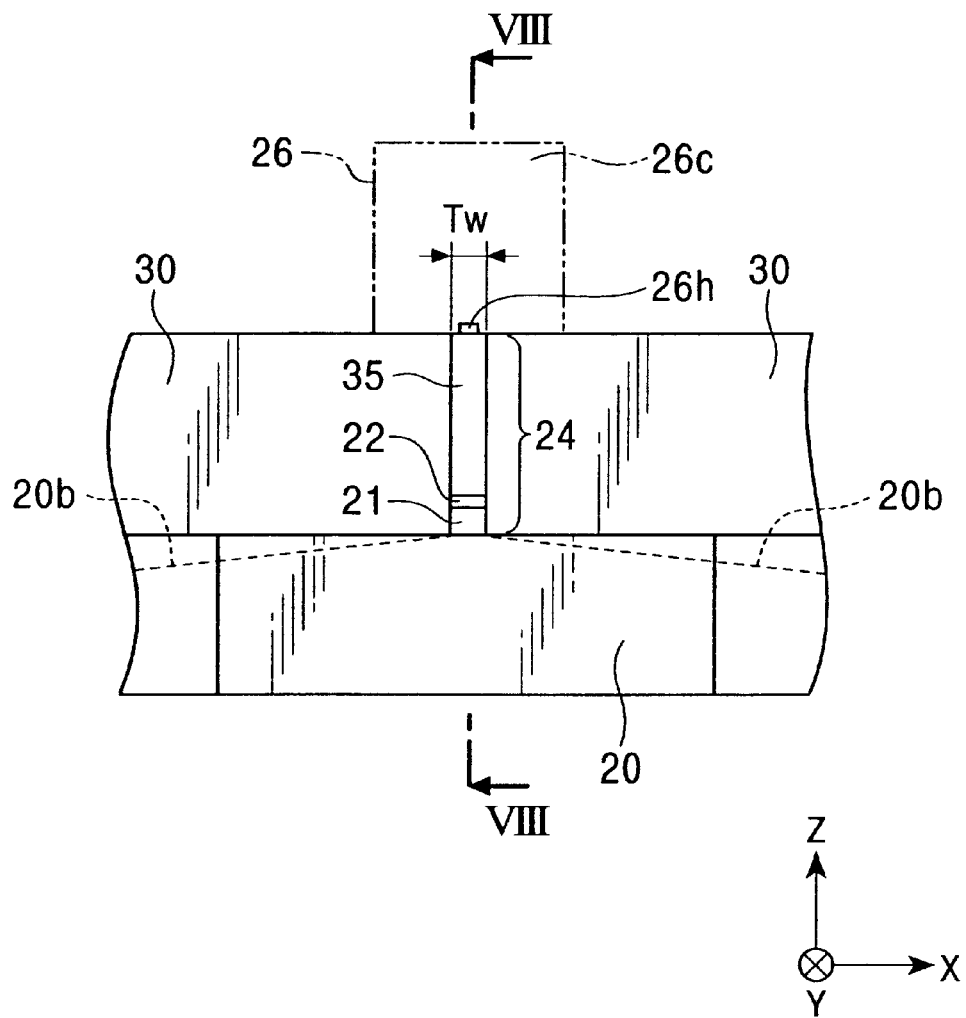
FIG. 7 is a partial front view showing the structure of a thin film magnetic head in accordance with another embodiment of the present invention.
Figure 8:
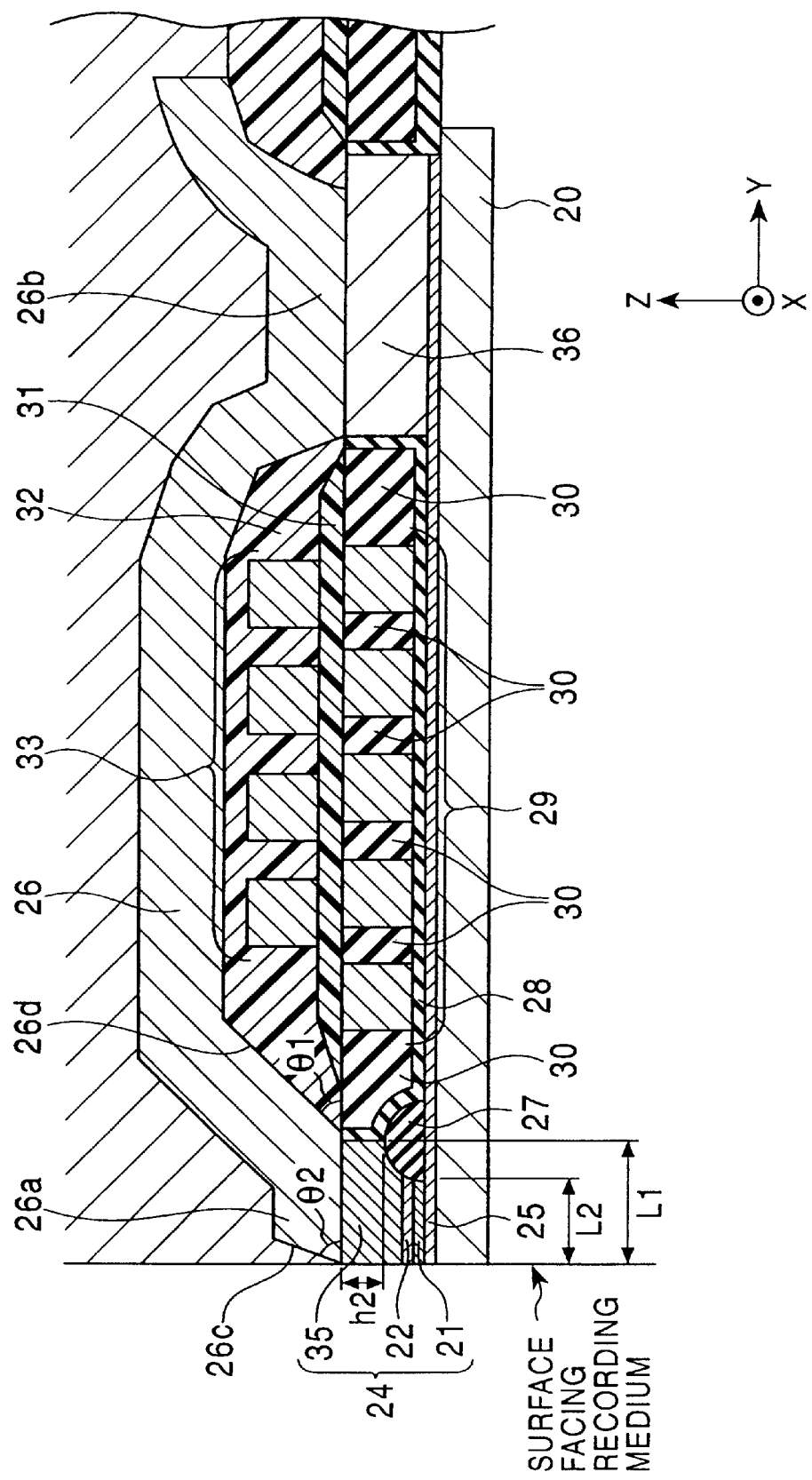
FIG. 8 is a partial cross-sectional view of the thin film magnetic head taken along line VIII—VIII in FIG. 7.
Figure 9:
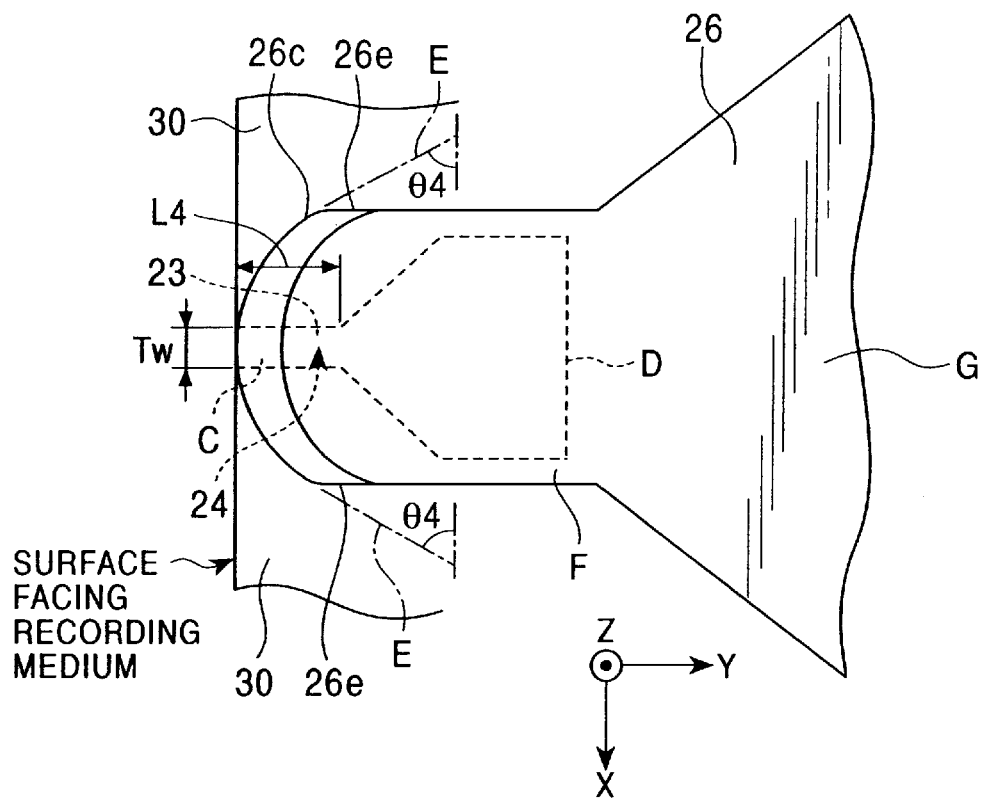
FIG. 9 is a partial plan view of the thin film magnetic head shown in FIGS. 7 and 8.
Figure 10:
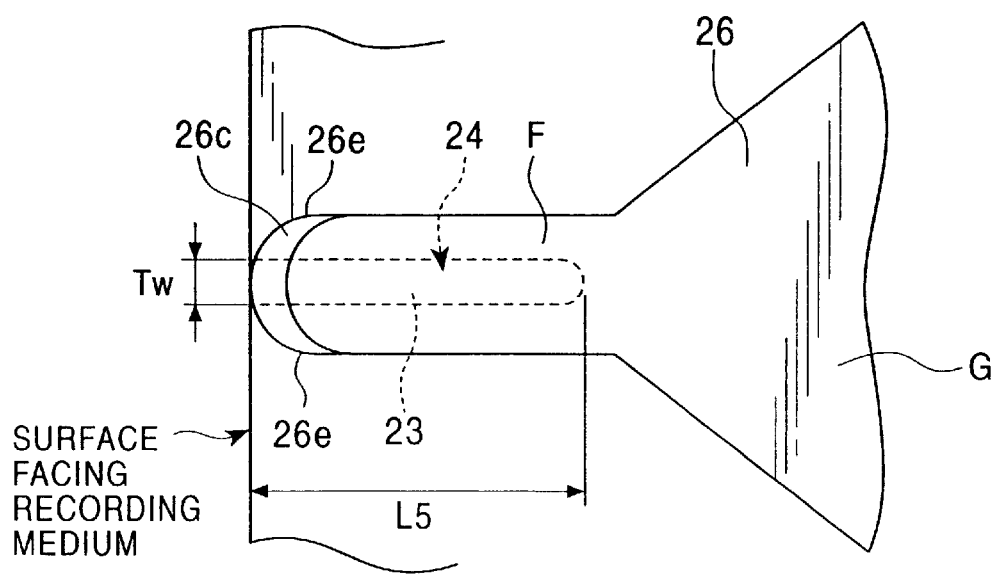
FIG. 10 is a partial plan view showing another embodiment of the shape of the thin film magnetic head shown in FIGS. 7 and 8.

FIG. 7 is a partial front view showing a thin film magnetic head in accordance with another embodiment of the present invention, and FIG. 8 is a partial sectional view of the thin film magnetic head taken along line VIII—VIII in FIG. 7 as viewed from an arrow direction. FIGS. 9 and 10 are partial plan views showing examples of the shape of the thin film magnetic head.

The thin film magnetic head shown in FIGS. 7 to 10 is the same as that shown in FIGS. 1 to 6 except that the shape of the upper core layer 26 is changed. In particular, as shown in FIG. 8, a recording core 24 is formed on a lower core layer 20 with the predetermined length dimension L1 measured from the face surface in the height direction. In this embodiment, the recording core 24 comprises a three layer film including a lower pole layer 21, a gap layer 22, and an upper pole layer 35, or a two layer film including the gap player 22 and the upper pole layer 35. Also, a Gd determining insulation layer 27 is formed between the lower core layer 20 and the recording core 24, and the length dimension L2 from the front surface of the Gd determining insulation layer 27 to the face surface is regulated as the gap depth (Gd).

As shown in FIG. 8, a coil layer 29 is spirally formed overlying on the portion of the lower core layer 20, which is behind the recording core 24 in the height direction, with the plating base layer 25 and an insulating base layer 28 provided therebetween. The pitch intervals of a conductor of the coil layer 29 are filled with an insulation layer 30 made of an inorganic insulating material or the like.

As further shown in FIG. 1, the insulation layer 30 is formed to be exposed at the surface facing the recording medium. Furthermore, an insulation layer 31 made of an organic insulating material or the like is formed on the coil layer 29, and a second coil layer 33 is spirally formed on the insulation layer 31.

The second coil layer 33 is covered with an insulation layer 32 made of an organic insulating material or the like, and the upper core layer 26 is patterned on the insulation layer 32 by, for example, a frame plating method or the like. The front end 26a of the upper core layer 26 is formed to overlap with the upper pole layer 35 so that the upper core layer 26 is magnetically connected to the upper pole layer 35. The base end 26b of the upper core layer 26 is magnetically connected to a lifting layer 36 formed on the lower core layer 20 by using a magnetic material.

Unlike in the embodiment shown in FIGS. 1 to 6, in this embodiment, the upper core layer 26 is not located behind the surface facing the recording medium in the height direction. The front end surface 26c of the upper core layer 26 is formed to extend to the face surface so that a portion thereof is located at the face surface.

As shown in FIG. 8, the front surface 26c of the upper core layer 26 is an inclined surface or curved surface so that the thickness (the X direction) of the upper core layer 26 gradually increases in the height direction (the Y direction).

As further shown in FIG. 8, the upper core layer 26 has a back surface 26d which into a curved surface or inclined surface, such that the thickness between the lower core layer side and the upper core layer side gradually increases in the height direction (the Y direction). Assuming that the inclination angle $\theta 1$ of the back surface 26d with respect to the height direction (in the case of the curved back surface 26d, the inclination angle of the line tangent to the curved surface at an intermediate point between the termination point at the magnetic core and the termination point on the underside of upper core layer with respect to the height direction), and the inclination angle of the front surface 26c with respect to the height direction is $\theta 2$, the inclination angle $\theta 2$ is preferably larger than the inclination angle $\theta 1$. In this way, where the inclination angle $\theta 2$ of the front surface 26c is larger than the inclination angle $\theta 1$ of the back surface 26d, tapering of the front end 26a of the upper core layer 26 can be prevented to effectively increase the volume of the front end 26a. Therefore, the magnetic flux from the upper core layer 26 can be efficiently caused to flow to the upper pole layer 35, thereby permitting improved recording performance.

In the present invention, besides the above condition, the inclination angle $\theta 2$ of the front end surface 26c is preferably in the range of about $60° \leq 2\theta < $ about $90°$. With the inclination angle $\theta 2$ of less than about $60°$, the front 26a of the upper core layer 26 is significantly tapered the volume of the front end 26a decreases, thereby easily deteriorating the transmission efficiency of the magnetic flux from the upper core layer 26 to the upper pole layer 35.

In the case in which the front surface 26c is formed into an inclined surface or a curved surface so that the thickness of the upper core layer 26 gradually increases in the height direction, the occurrence of side fringing can be appropriately suppressed in combination with the curved shape of the front surface 26c in the track width direction (the X direction shown in the drawing), which will be described below.

In the present invention, as shown in FIG. 9, the front surface 26c of the upper core layer 26 is formed in the shape of a curved surface so that the front surface 26c gradually retreats in the height direction (the Y direction) as it approaches both sides in the track width direction.

Since the front surface 26c of the upper core layer 26 is a curved surface so that the front surface 26c gradually retreats in the height direction as it approaches both sides in the track width direction (the X direction shown in the drawing), only the portion of the front surface 26c of the upper core layer 26, which is denoted by reference numeral 26h in FIG. 7, is exposed at the surface facing the recording medium. As a result, a structure is formed, in which the front surface 26c of the upper core layer 26 is slightly exposed at the surface facing the recording medium.

In particular, in the present invention, the front surface 26c of the upper core layer 26 is a curved surface so that the front surface 26c gradually retreats in the height direction (the Y direction) as it approaches both sides in the track width direction, and the front surface 26c of the upper core layer 26 is formed in an inclined surface or curved surface so that the thickness of the upper core layer 26 gradually increases in the height direction. Therefore, the front surface 26c of the upper core layer 26 is slightly exposed at the face surface, thereby decreasing a leakage magnetic flux between the upper core layer 26 and the upper pole layer 35, and further decreasing the occurrence of side fringing.

The portion 26h of the front surface 26c of the upper core layer 26, which is exposed at the surface facing the recording medium, preferably has a width dimension smaller than the track width Tw. This can appropriately further prevent the occurrence of side fringing.

Where the front surface 26c of the upper core layer 26 is a curved surface in the track width direction (the X direction), even when the formation position of the upper core layer 26 relative to the upper pole layer 35 is slightly shifted in the track width direction (the X direction), the effect of side fringing can be decreased as compared with the case in which the front surface 26c is formed in a planar shape in the track width direction. It is thus possible to manufacture a thin film magnetic head in which the occurrence of side fringing can be appropriately decreased even when the precision of alignment of the upper core layer 26 with the upper pole layer 35 is slightly decreased.

In the present invention, assuming that the line tangent to each of the termination points 26e of the front surface 26c in the track width direction is a virtual line E shown in FIG. 9, the inclination angle $\theta 4$ of the virtual line E with respect to the track width direction (the X direction) is preferably about 30° to about 60°. By setting the inclination angle $\theta 4$ to about 30° to about 60°, even when the front surface 26c of the upper core layer 26 is formed at substantially the same position as the face surface, side fringing can be appropriately suppressed without decreasing the transmission efficiency of the magnetic flux flowing from the upper core layer 26 to the upper pole layer 35.

Like the embodiment of FIG. 9, in the embodiment shown in FIG. 10, the front surface 26c of the upper core layer 26 is an inclined surface or curved surface so that the thickness of the upper core layer 26 increases in the height direction (the Y direction shown in the drawing), and so that the upper core layer 26 gradually retreats in the height direction (the Y direction) as it approaches both sides in the track width direction.

A difference between the embodiments shown in FIGS. 9 and 10 lies in the shape of the recording core 24 formed below the upper core layer 26. Namely, the recording core 24 shown in FIG. 9 comprises a front region C formed with the track width Tw to extend from the face surface in the height direction, and a back region D, which has a width dimension in the track width direction that gradually increases in the height direction (the Y direction), and which starts from the terminal of the front region C. On the other hand, the recording core 24 shown in FIG. 10 is formed with the track width Tw and the predetermined length L5 measured from the face surface in the height direction, without the back end region D.

In the recording core 24 shown in FIG. 9, when the length dimension L4 of the front region C formed with the track width Tw is excessively small, the track width Tw is possibly increased to a value higher than the predetermined dimension due to processing of the face surface in the manufacture of the thin film magnetic head. However, the presence of the back region D has the advantage of increasing the contact area with the upper core layer 26. On the other hand, the shape of the recording core 24 shown in FIG. 10 has a smaller contact area with the upper core layer 26 than the embodiment shown in FIG. 9, but has the advantage that the track width Tw can easily be regulated within the predetermined dimension range.

In the recording core 24 shown in FIG. 9, the length dimension L4 of the front region C is preferably in the range of about 0 $\mu$m<L4$\leq$about 3.0 $\mu$m, while in the recording core 24 shown in FIG. 10, the length dimension L5 is preferably in the range of about 0.8 $\mu$m<L5$\leq$about 6.0 $\mu$m. The reason for this is the same as described above.

In the embodiments shown in FIGS. 9 and 10, the end of the upper core layer 26, which is joined to the upper pole layer 35, has a width dimension in the track width direction larger than the width dimension of the upper pole layer 35. Accordingly, the magnetic flux from the upper core layer 26 can be efficiently caused to flow to the upper pole layer 35. In the overlap portion, the width dimension of the upper core layer 26 in the track width direction is preferably about 2 to 2.5 times the width dimension of the recording core 24 in the track width direction. The reason for this is as described above.

As shown in FIGS. 9 and 10, the upper core layer 26 comprises a front region F formed with a constant width dimension to extent from the face surface in the height direction (the Y direction), and a back region G, which has a width dimension in the track width direction that gradually increases in the height direction, and which starts from the termination point of the front end region F. However, in the present invention, the shape of the upper core layer 26 is not limited to this. For example, the front region F of the upper core layer 26 may be formed so that the width dimension increases along the virtual lines E.

Figure 11:
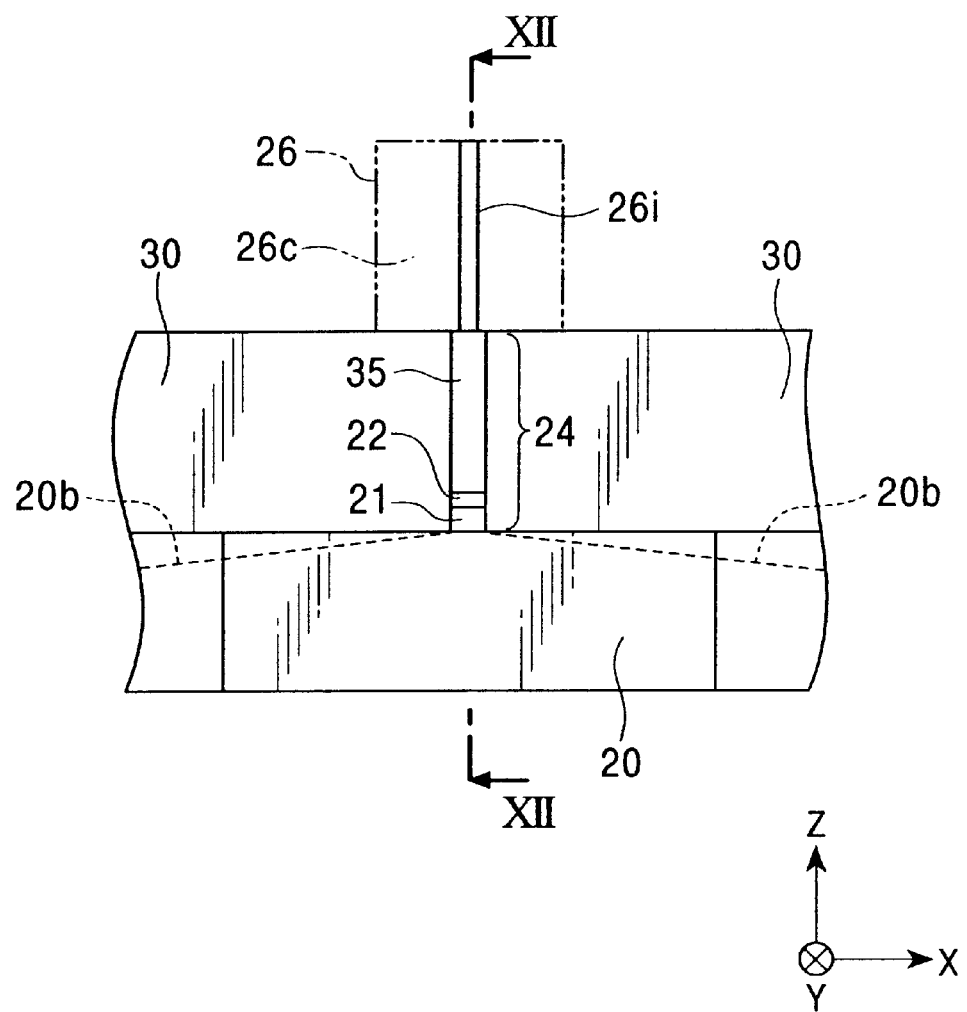
FIG. 11 is a partial front view showing the structure of a thin film magnetic head in accordance with still another embodiment of the present invention.
Figure 12:
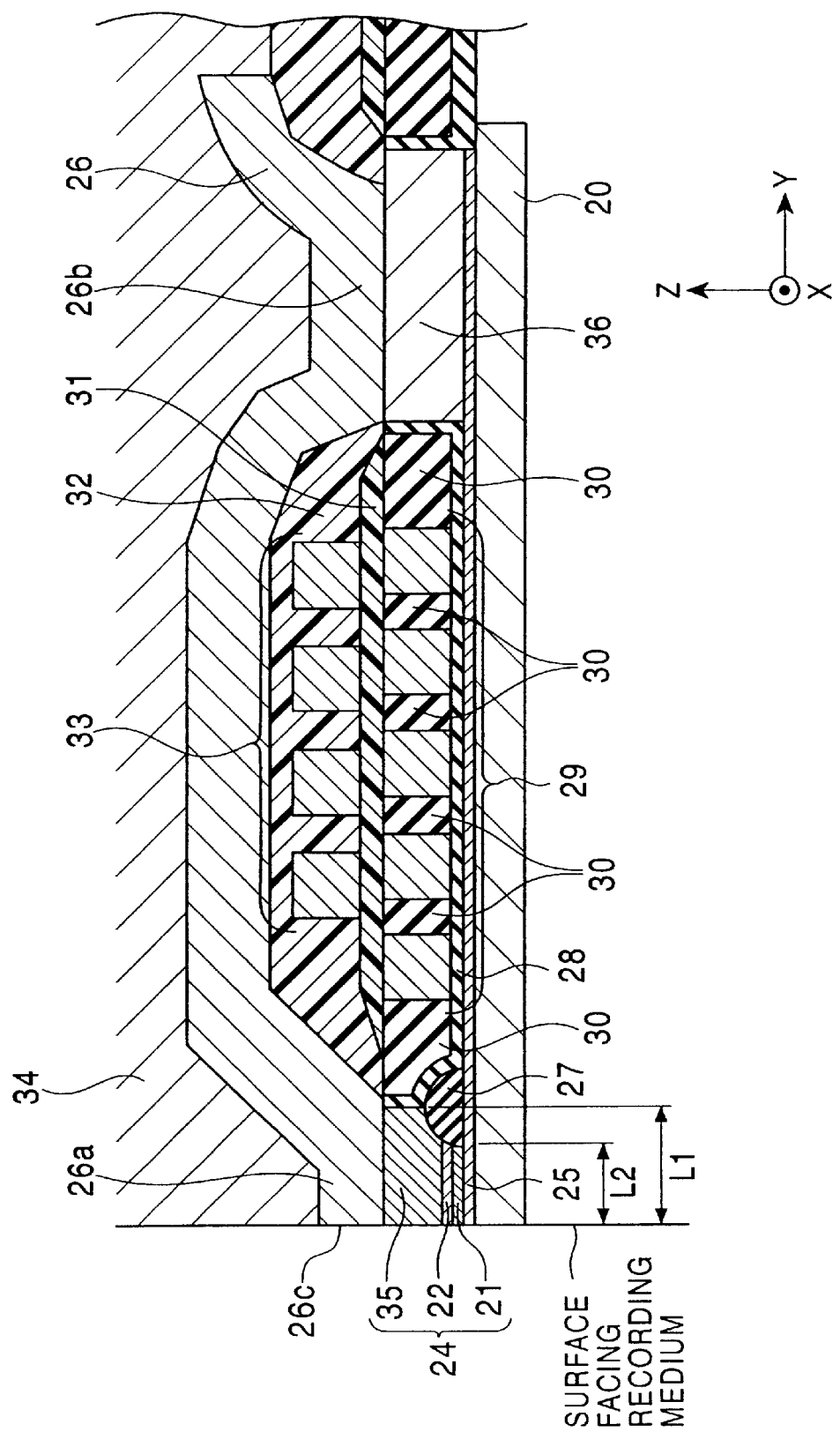
FIG. 12 is a partial sectional view of the thin film magnetic head taken along line XII—XII in FIG. 11.
Figure 13:
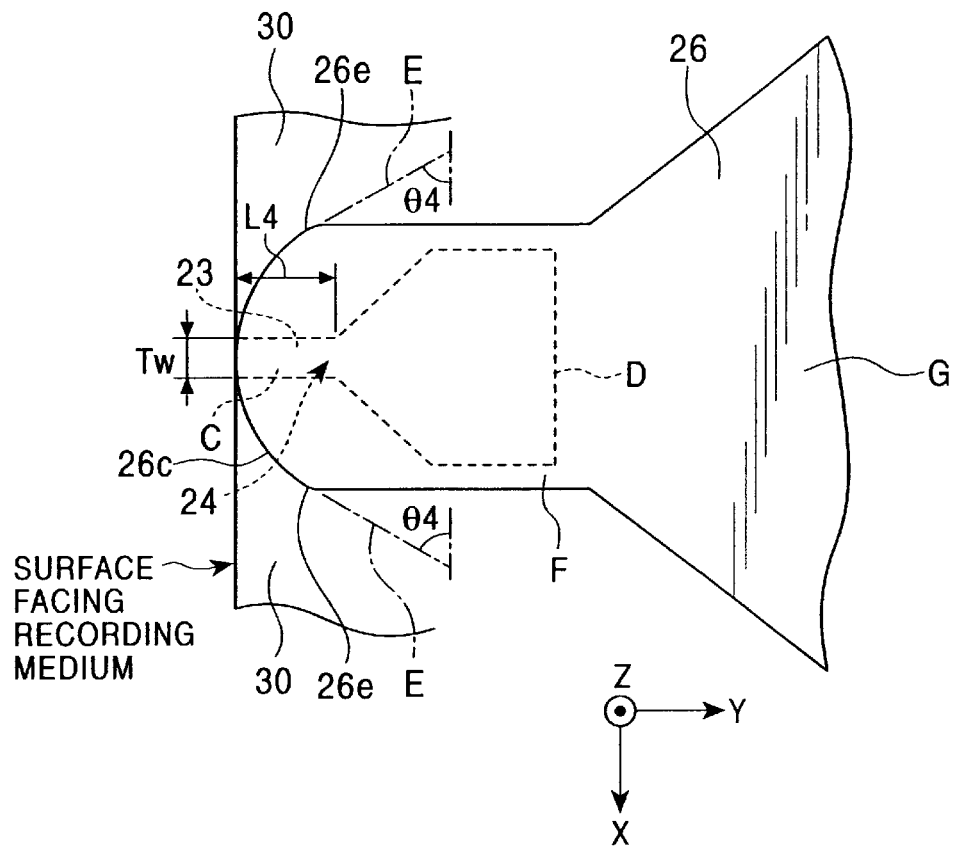
FIG. 13 is a partial plan view of the thin film magnetic head shown in FIGS. 11 and 12.
Figure 14:
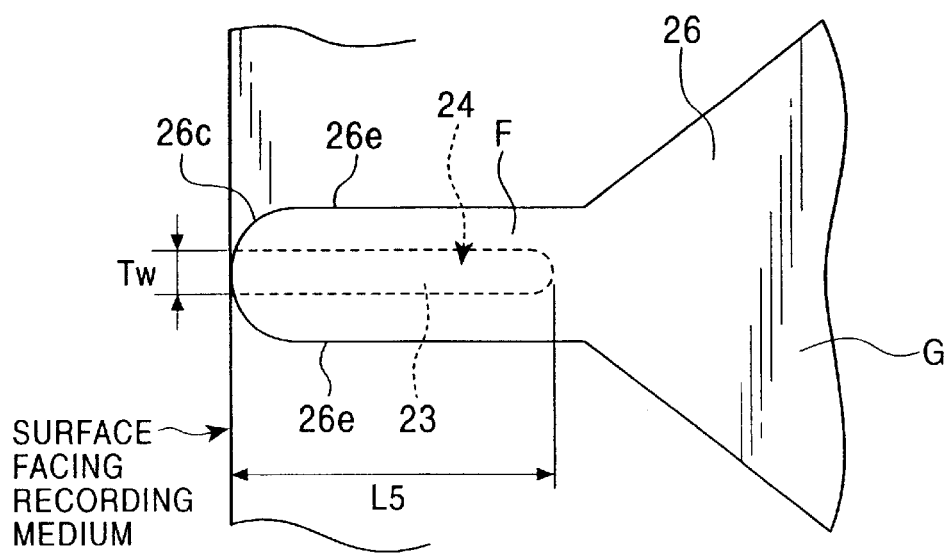
FIG. 14 is a partial plan view showing another example of the shape of the thin film magnetic head shown in FIGS. 11 and 12.

FIG. 11 is a partial front view showing the structure of a thin film magnetic head in accordance with still another embodiment of the present invention, and FIG. 12 is a partial cross-sectional view of the thin film magnetic head taken along line XII—XII in FIG. 11 as viewed from an arrow direction. FIGS. 13 and 14 are partial plan views showing examples of the shape of the thin film magnetic head.

The thin film magnetic head shown in FIGS. 11 to 14 is the same as that shown in FIGS. 1 to 6 except that the shape of the upper core layer 26 is changed. In particular, as shown in FIG. 12, a recording core 24 is formed on a lower core layer 20 with the predetermined length dimension L1 measured from the face surface in the height direction. In this embodiment, the recording core 24 comprises a three layer film including a lower pole layer 21, a gap layer 22, and an upper pole layer 35, or a two layer film including the gap layer 22 and the upper pole layer 35. Also, a Gd determining insulation layer 27 is formed between the lower core layer 20 and the recording core 24, and the length dimension L2, measured from the front surface of the Gd determining insulation layer 27 to the face surface, is regulated as the gap depth (Gd).

As shown in FIG. 12, a coil layer 29 is spirally formed overlying the portion of the lower core layer 20 that is behind the recording core 24 in the height direction, with the plating underlayer 25 and an insulating base layer 28 provided therebetween. The pitch intervals of the conductor of the coil layer 29 are filled with an insulation layer 30 made of an inorganic insulating material or the like. As shown in FIG. 11, the insulation layer 30 is exposed at the face surface. As shown in FIG. 11, inclined surfaces 20b may be formed at the top of the lower core layer 20 to appropriately further prevent the occurrence of side fringing. Furthermore, an insulation layer 31 made of an organic insulating material or the like is formed on the coil layer 29, and a second coil layer 33 is spirally formed on the insulation layer 31.

The second coil layer 33 is covered with an insulation layer 32 made of an organic insulating material or the like, and the upper core layer 26 is patterned on the insulation layer 32 by, for example, a frame plating method or the like. The front end 26a of the upper core layer 26 is formed to overlap with the upper pole layer 35, so that the upper core layer 26 is magnetically connected to the upper pole layer 35. The base end 26b of the upper core layer 26 is magnetically connected to a lifting layer 36 formed on the lower core layer 20 by using a magnetic material.

Unlike in the embodiments shown in FIGS. 1 to 6, in this embodiment, the upper core layer 26 is not located behind the surface facing the recording medium in the height direction. The front surface 26c of the upper core layer 26 extends to the surface, so that a portion thereof is located at the face surface.

As shown in FIG. 13, the front surface 26c of the upper core layer 26 is an inclined surface so that the upper core layer 26 gradually retreats in the height direction (the Y direction) as it approaches both side ends. Unlike in the embodiments shown in FIGS. 1 to 6, and the embodiments shown in FIGS. 7 to 10, in this embodiment, the front surface 26c of the upper core layer 26 is formed along the face surface and not in an inclined surface or a curved surface in which the thickness of the upper core layer 26 gradually increases in the height direction. As shown in FIG. 11, the portion 26i of the front surface 26c of the upper core layer 26, which has a constant width dimension over the entire upper core layer, is exposed at the face surface.

Since the front surface 26c of the upper core layer 26 is a curved surface so that the front end surface 26c gradually retreats in the height direction as it approaches both sides in the track width direction, as described above, only the portion of the front surface 26c of the upper core layer 26, which is denoted by reference numeral 26i in FIG. 11, is exposed at the surface facing the recording medium. As a result, a structure is formed, in which the front surface 26c of the upper core layer 26 is slightly exposed at the face surface even when the front surface 26c is located at the face surface. Therefore, a leakage magnetic flux between the upper core layer 26 and the upper pole layer 35 can be decreased, further decreasing the occurrence of side fringing.

The portion 26i of the front surface 26c of the upper core layer 26, which is exposed at the face surface, preferably has a width dimension smaller than the track width Tw. This can appropriately further prevent the occurrence of side fringing.

Where the front surface 26c of the upper core layer 26 is a curved surface in the track width direction, even when the position of the upper core layer 26 relative to the upper pole layer 35 is slightly shifted in the track width direction (the X direction), the effect of side fringing can be decreased as compared with the case in which the front end surface 26c is formed in a planar shape in the track width direction. It is thus possible to manufacture a thin film magnetic head in which the occurrence of side fringing can be appropriately decreased even when the precision of alignment of the upper core layer 26 with the upper pole layer 35 is slightly decreased.

In the present invention, assuming that the line tangent to each of the termination points 26e of the front surface 26c in the track width direction is a virtual line E, the inclination angle θ4 of the virtual line E with respect to the track width direction (the X direction) is preferably about 30° to about 60°. By setting the inclination angle θ4 to about 30° to about 60°, even when the front surface 26c of the upper-core layer 26 is at substantially the same position as the face surface, side fringing can be appropriately suppressed without decreasing the transmission efficiency of the magnetic flux flowing from the upper core layer 26 to the upper pole layer 35.

Like the embodiment of FIG. 13, in the embodiment shown in FIG. 14, the front surface 26c of the upper core layer 26 is a curved surface so that the upper core layer 26 gradually retreats in the height direction (the Y direction) as it approaches both sides in the track width direction. However, unlike the embodiment shown in FIGS. 1 to 6 and the embodiment shown in FIGS. 7 to 10, the front surface 26c is not formed in an inclined surface or a curved surface so that the thickness of the upper core layer 26 does not increase in the height direction.

A difference between the embodiments shown in FIGS. 13 and 14 lies in the shape of the recording core 24 formed below the upper core layer 26. In particular, the recording core 24, shown in FIG. 13, comprises a front region C formed with the track width Tw to extend from the face of surface in the height direction, and a back region D, which has a width dimension in the track width direction that gradually increases in the height direction (the Y direction), and which starts from the termination point of the front region C. On the other hand, the recording core 24 shown in FIG. 14 is formed with the track width Tw and the predetermined length L5 measured from the face surface in the height direction, without the back region D.

In the recording core 24 shown in FIG. 13, when the length dimension L4 of the front region C formed with the track width Tw is excessively small, the track width Tw is possibly increased to a value higher than the predetermined dimension due to processing of the face surface in the manufacture of the thin film magnetic head. However, the presence of the back region D has the advantage of increasing the contact area with the upper core layer 26. On the other hand, the shape of the recording core 24 shown in FIG. 14 has a smaller contact area with the upper core layer 26 than the embodiment shown in FIG. 9, but has the advantage that the track width Tw can easily be regulated within the predetermined dimension range.

In the recording core 24 shown in FIG. 13, the length dimension L4 of the front region C formed is preferably in the range of about $0.2 \ \mu m < L4 \leq$ about $3.0 \ \mu m$, while in the recording core 24 shown in FIG. 14, the length dimension L5 is preferably in the range of about $0.8 \ \mu m < L5 \leq$ about $6.0 \ \mu m$. The reason for this is as described above.

In the embodiments shown in FIGS. 13 and 14, the end of the upper core layer 26, which is joined to the upper pole layer 35, has a width dimension in the track width direction larger than the width dimension of the upper pole layer 35. Accordingly, the magnetic flux from the upper core layer 26 can be efficiently caused to flow to the upper pole layer 35. In the overlap portion, the width dimension of the upper core layer 26 in the track width direction is preferably about 2 to 2.5 times the width dimension of the recording core 24 in the track width direction. The reason for this is as described above.

As shown in FIGS. 13 and 14, the upper core layer 26 comprises a front region F formed with a constant width dimension to extent from the face surface in the height direction, and a back region G which has a width dimension in the track width direction that gradually increases in the height direction, and which starts from the termination point of the front region F. However, in the present invention, the shape of the upper core layer 26 is not limited to this. For example, the front end region F of the upper core layer 26 may be formed so that the width dimension increases along the virtual lines E.

As described above, in the thin film magnetic head of the present invention, the upper core layer 26 is located behind the face surface in the height direction, and the front surface 26c of the upper core layer 26 is an inclined surface or curved surface so that the thickness of the upper core layer 26 gradually increases in the height direction, and is formed in a curved surface so that the upper core layer 26 gradually retreats in the height direction as it approaches both sides in the track width direction. Alternatively, the upper core layer 26 is located behind the surface facing the recording medium in the height direction, and the front surface 26c of the upper core layer 26 is an inclined surface or a curved surface so that the thickness of the upper core layer 26 gradually increases in the height direction, or the front surface 26c of the upper core layer 26 is an inclined surface or a curved surface so that the thickness of the upper core layer 26 gradually increases in the height direction, and formed in a curved surface so that the upper core layer 26 gradually retreats in the height direction as it approaches both sides in the track width direction. Alternatively, the front surface 26c of the upper core layer 26 is formed in a curved surface so that the upper core layer 26 gradually retreats in the height direction as it approaches both sides in the track width direction. It is thus possible to manufacture a thin film magnetic head which can suppress the occurrence of side fringing, and can efficiently cause the magnetic flux to flow from the upper core layer 26 to the upper pole layer 35, and which is adaptable to a higher recording density in future.

The method of manufacturing the thin film magnetic head of the present invention will be described below with reference to the drawings. FIGS. 15 to 21 are drawings showing the steps of a method of manufacturing the thin film magnetic head shown in FIGS. 1 to 4 in accordance with the invention. In each of FIGS. 15 to 18, a partial front view of the thin film magnetic head is given on the left side, and a partial cross-sectional view thereof is given on the right side.

Figure 15A:
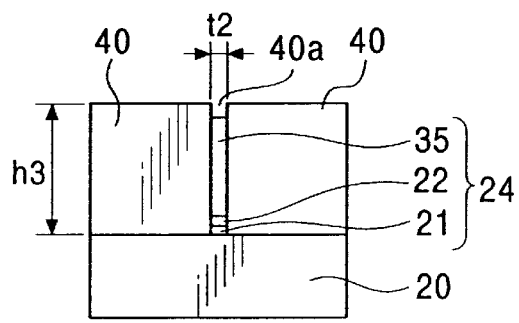
FIGS. 15A and 15B are a partial front view and a partial cross-sectional view showing a method of manufacturing a thin film magnetic head in accordance with the present invention.
Figure 15B:
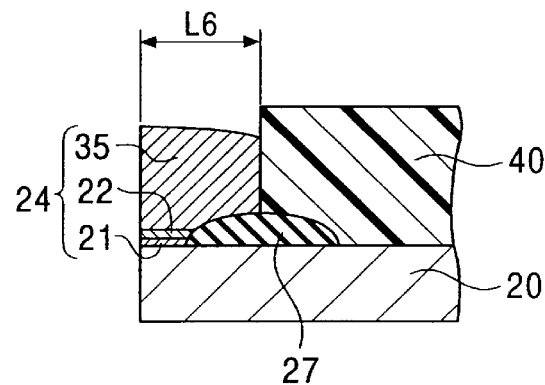

As shown in FIG. 15B, the Gd determining insulation layer 27 is formed on the lower core layer 20, and then a resist layer 40 having height dimension h3 is formed on the lower core layer 20. The height dimension h3 is, for example, about 4.0 $\mu$m.

Next, the resist layer 40 is exposed and developed to form a trench 40a having the predetermined length dimension L6 from the face surface in the height direction (the Y direction shown in the drawing). The width dimension t2 of the trench 40a is, for example, about 0.45 $\mu$m. The width dimension t2 is regulated as the track width Tw, and thus is preferably set to be as small as possible. For example, the width dimension t2 is preferably the limit value of the i line used for exposure.

Next, as shown in FIG. 15A, the lower pole layer 21, the gap layer 22 and the upper pole layer 35 are sequentially laminated by plating in the trench 40a. This continuous plating requires a nonmagnetic metal material, which can be plated for forming the gap layer 22. Specifically, the nonmagnetic metal material is at least one material preferably selected from NiP, NiPd, NiW, NiMo, Au, Pt, Rh, Pd, Ru, and Cr.

The recording core 24 comprises the three layer film formed in the trench 40. The structure of the recording core 24 is not limited to the three layer film. For example, the recording core 24 may comprise the gap layer 22 and the upper pole layer 35.

Figure 16A:
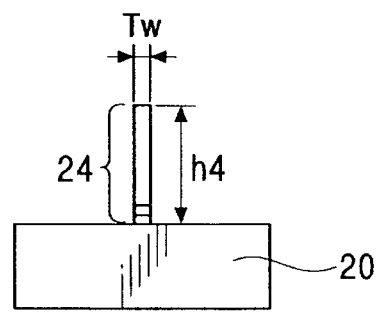
FIGS. 16A and 16B are a partial front view and a partial sectional view showing a step carried out in accordance with the invention after the step shown in FIGS. 15A and 15B.
Figure 16B:
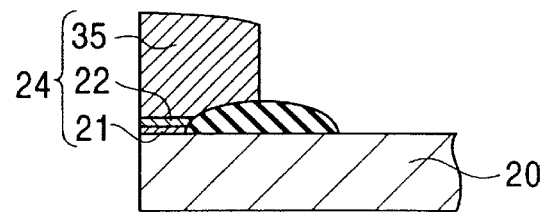

Then, the resist layer 40 is removed. FIGS. 16A and B show the state after the resist layer 40 is removed, in which the width dimension of the recording core 24 formed on the lower core layer 20 is regulated as the track width Tw which is preferably about 0.7 $\mu$m or less, and more preferably about 0.5 $\mu$m or less.

The height dimension h4 of the recording core 24 is preferably in the range of about 1 $\mu$m $\leq$ h4 $\leq$ about 4 $\mu$m. For example, the height dimension of the lower pole layer 21 is about 0.3 $\mu$m, the height dimension of the gap layer 22 is about 0.2 $\mu$m, and the height dimension of the upper pole layer 35 is about 3.0 $\mu$m to 3.3. $\mu$m.

Figure 17A:
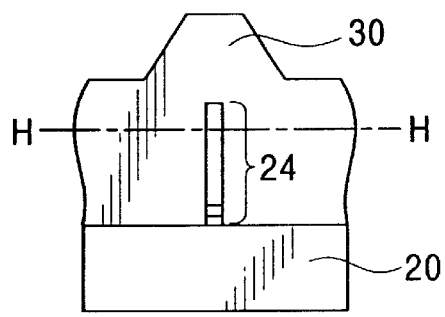
FIGS. 17A and 17B are a partial front view and a partial cross-sectional view showing a step carried out in accordance with the invention after the step shown in FIGS. 16A and 16B.
Figure 17B:
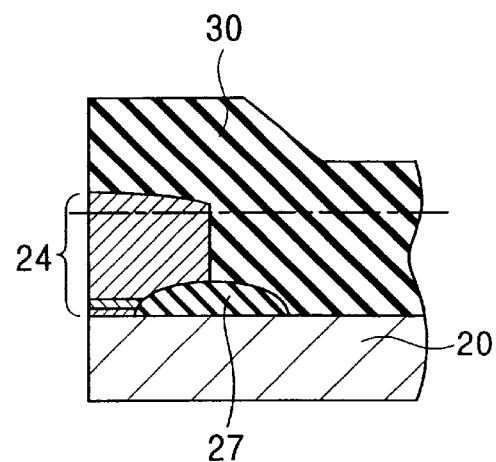

Next, as shown in FIGS. 17A and B, the insulation layer 30 is formed to cover the lower core layer 20 and the recording core 24. An inorganic insulating material is preferably used as the insulating material for forming the insulation layer 30. Specifically, at least one insulating material is preferably selected from AlO, $Al_2O_3$, $SiO_2$, $Ta_2O_5$, TiO, AlN, AlSiN, TiN, SiN, $Si_3N_4$, NiO, WO, $WO_3$, BN, CrN, and SiON. The reason for forming insulation layer 30 using an inorganic insulating material, is to facilitate polishing of the surface of the insulation layer 30 by a CMP technique in the next step As shown in FIGS. 17A and B, the insulation layer 30 is ground to line H—H by the CMP technique. As a result, the surface of the insulation layer 30 is planarized, and the surface of the upper pole layer 35 is exposed from the surface of the insulation layer 30. This state is shown in FIGS. 18A and B.

Figure 18A:
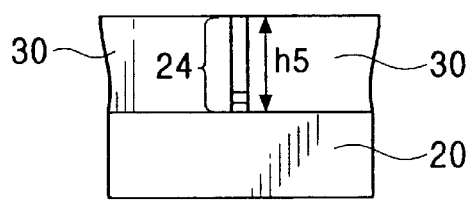
FIGS. 18A and 18B are a partial front view and a partial cross-sectional view showing a step carried out in accordance with the invention after the step shown in FIGS. 17A and 17B.
Figure 18B:
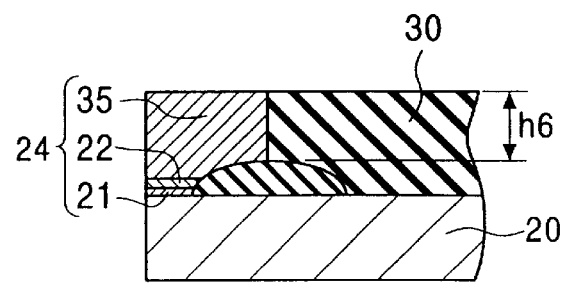

In the step shown in FIGS. 17A and B, the surface of the recording core 24 is ground by the CMP technique so that the recording core 24 has a height dimension h5 of, for example, about 2.4 to about 2.7 $\mu$m, as shown in FIGS. 18A and B. As shown in FIG. 18B, the upper pole layer 35 formed on the Gd determining insulation layer 27 has a height dimension h6 of about 1.4 to about 1.7 $\mu$m.

In the manufacturing method of the present invention, the height dimension h5 of the recording core 24, and the height dimension of the upper pole layer 35 formed on the Gd determining insulation layer 27 can be easily set in the predetermined ranges to permit the manufacture of a thin film magnetic head with high reproducibility. The reason for this is that unlike a conventional method, the step of trimming in a direction close to the direction perpendicular to the film plane of the lower core layer 20 is not performed. In the conventional method, the trimming step is a necessary step for suppressing the occurrence of side fringing, but the trimming step causes a significant decrease in the height dimension of the upper pole layer 35, and the occurrence of variation in the track width Tw, thereby significantly deteriorating the reproducibility of manufacture. On the other hand, in the present invention, the gap layer 22 which constitutes the recording core 24 is made of a nonmagnetic platable metal material so that the lower pole layer 21, the gap layer 22 and the upper pole layer 35 can be continuously formed in turn by plating in the trench 40*a* of the resist layer 40 shown in FIGS. 15A and B.

In the present invention, the lower pole layer 21 protruding with the track width Tw from the lower core layer 20, and the gap layer 22 formed thereon with the track width Tw can be formed without the step of trimming in a direction close to the direction perpendicular to the film plane of the lower core layer 20. Therefore, a thin film magnetic head having a structure causing less side fringing between the upper pole layer 35 and the lower core layer 20 can be formed without the trimming step.

However, in the present invention, the trimming step may be performed in the step shown in FIGS. 16A and B. In this case, the trimming step preferably comprises ion irradiation directed at an oblique angle to the film plane of the lower core layer 20 at an ion irradiation angle within the range of about 45 to about 75°, more preferably about 60 to about 75°, with the respect to direction perpendicular to the film plane.

In the trimming step comprising ion irradiation at the above angle, unlike in the conventional method, magnetic powder produced by ion irradiation does not adhere to both sides of the recording core 24. Also, in the present invention, ion milling at an ion irradiation angle close to a right angle with the film plane of the lower core layer 20 is not performed, thereby causing less variation in the shape of the recording core 24 and no problem of significantly decreasing the height dimension of the recording core 24 even when the trimming step is performed obliquely to the film plane of the lower core layer 20.

In the present invention, the track width Tw of the recording core 24 can be further decreased by the trimming step to permit the manufacture of a thin film magnetic head adaptable to track narrowing in future. Furthermore, the inclined surfaces 20*b* (refer to FIG. 1) can be formed at the top of the lower core layer 20 which extends from the bottom of the recording core 24 to both sides thereof to permit the manufacture of a thin film magnetic head capable of further suppressing the occurrence of side fringing.

Figure 19:
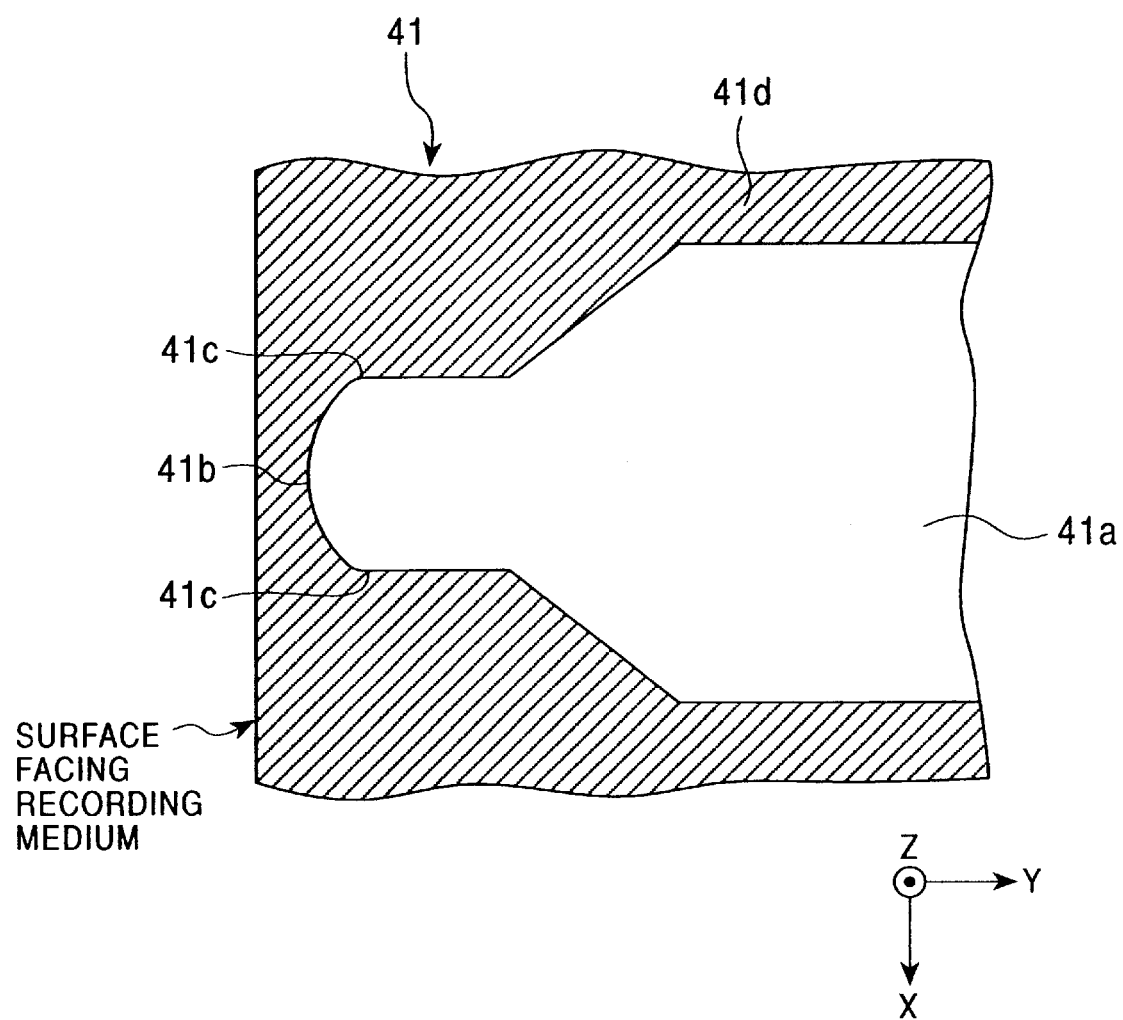
FIG. 19 is a partial plan view showing a step carried out in accordance with the invention after the step shown in FIGS. 18A and 18B.

Next, the coil layer is formed on the insulation layer 30, and the insulation layer 32 is formed to cover the coil layer. Then, a resist layer 41 is formed on the surfaces of the upper pole layer 35, the insulation layer 30 and the insulation layer 32, as shown in FIG. 19. FIG. 19 is a partial plan view of the thin film magnetic head.

As shown in FIG. 19, a removed pattern 41*a* for the upper core layer 26 is formed in the resist layer 41. As further shown in FIG. 19, the front surface 41*b* of the pattern 41*a* is formed in a curved surface so that it gradually retreats from the face surface in the height direction (the Y direction shown in the drawing) as it approaches both sides 41*c* in the track width direction.

In order to form the pattern 41*a*, the following method is performed in the present invention. In the present invention, the only portion 41*d* of the resist layer 41 other than the pattern 41*a* thereof is irradiated with light during exposure, and then developed to remove the resist layer 41 of the pattern 41*a*, leaving the portion 41*d* of the resist layer 41 (image reverse). This is an exposure development method reverse to a conventional method in which the pattern portion 41*a* corresponding to the upper core layer 26 is irradiated with light.

In the present invention, the reason the portion 41*d* of the resist layer 41 other than the pattern 41*a* thereof is irradiated with light and developed to remove the portion of the pattern 41*a* not irradiated with light is associated with the shape of the left portion 41*d* of the resist layer 41.

Figure 20:
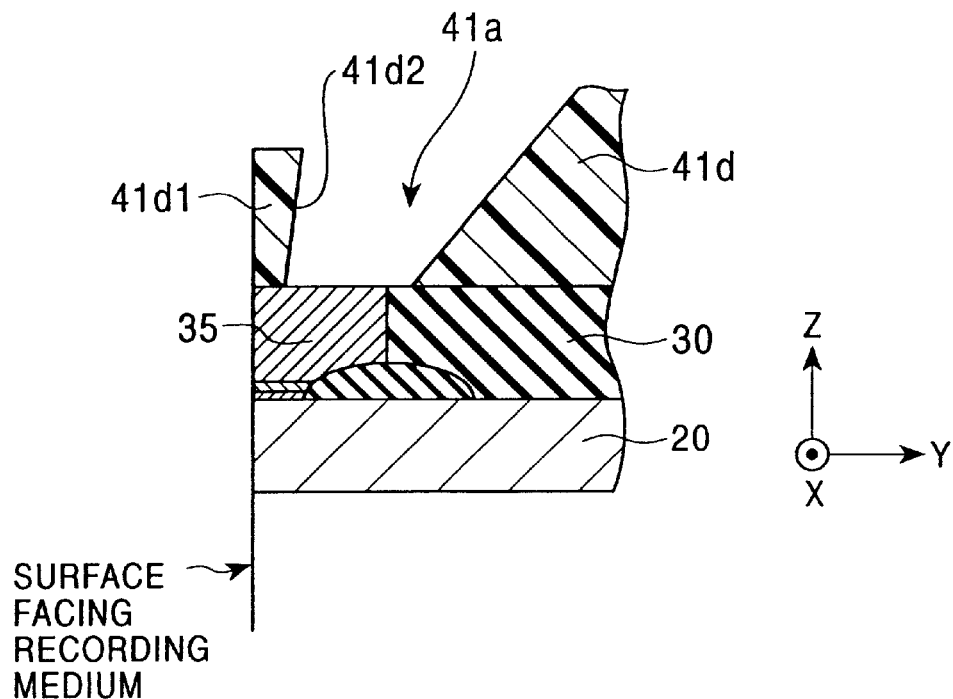
FIG. 20 is a partial cross-sectional view showing a step carried out in accordance with the invention after the step shown in FIG. 19.

FIG. 20 is a partial sectional view of the thin film magnetic head of the present invention. FIG. 20 shows only the shape of the portion near the front end of the thin film magnetic head. As shown in FIG. 20, the portion 41*d* of the resist layer is left on the insulation layer 30 and the upper pole layer 35. In this portion 41*d*, the portion 41*d*1 of the resist layer 41, which is left with a predetermined length dimension from the face surface in the height direction, has a back surface 41*d*2, which is an inclined surface or a curved surface inclined in the height direction (the Y direction shown in the drawing) from the lower core layer side to the upper core layer side (the Z direction).

The reason the portion 41*d*1 of the resist layer 41 is left in the above-described shape is that the portion 41 d of the resist layer 41 is irradiated with light during exposure. Conversely, when the portion of the pattern 41*a* to be removed is irradiated with light, while the portion 41*d* of the resist layer 41 is not irradiated with light, the remaining portion 41*d*1 of the resist layer 41 has the back surface 41*d*2 which is an inclined surface or curved surface inclined in the direction reverse to the height direction (the Y direction) from the lower core layer side to the upper core layer side, as shown in FIG. 22.

Figure 21:
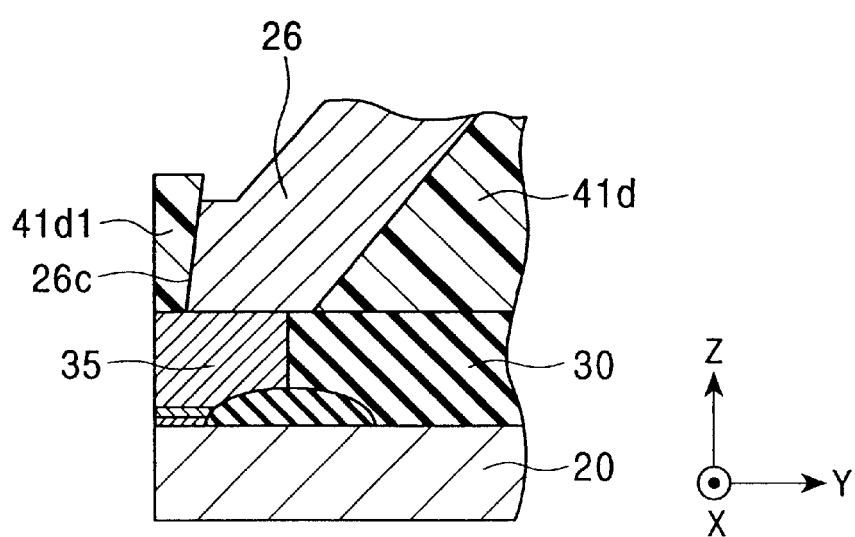
FIG. 21 is a partial cross-sectional view showing a step carried out in accordance with the invention after the step shown in FIG. 20.

Where, as shown in FIG. 20, the portion 41*d*1 of the resist layer 41 which is left with a predetermined length dimension from the surface facing the recording medium in the height direction has the back surface 41*d*2 which is formed in an inclined surface or a curved surface inclined in the height direction (the Y direction shown in the drawing) from the magnetic core to the upper core layer (the Z direction), the front surface 26*c* of the upper core layer 26 can be formed in an inclined surface or curved surface by plating the magnetic material used as the material for the upper core layer 26 in the pattern 41*a* so that the thickness of the upper core layer 26 gradually increases in the height direction, as shown in FIG. 21.

Figure 22:
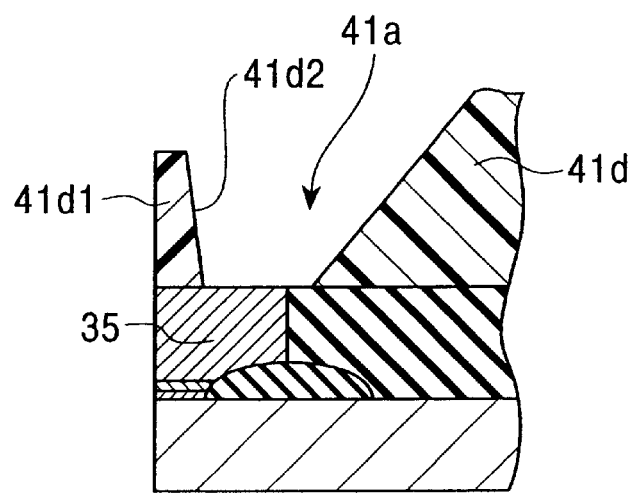
FIG. 22 is a partial cross-sectional view showing another embodiment of a step carried out in accordance with the invention after the step shown in FIG. 19.
Figure 23:
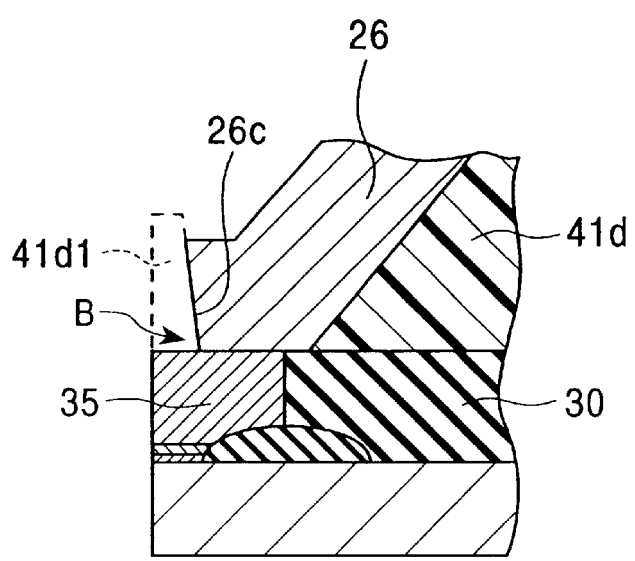
FIG. 23 is a partial cross-sectional view showing a step carried out in accordance with the invention after the step shown in FIG. 22.
Figure 24:
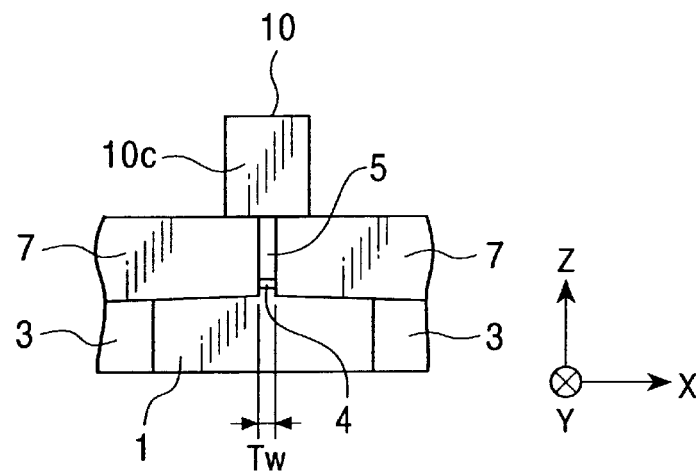
FIG. 24 is a partial front view showing the structure of a conventional thin film magnetic head.
Figure 25:
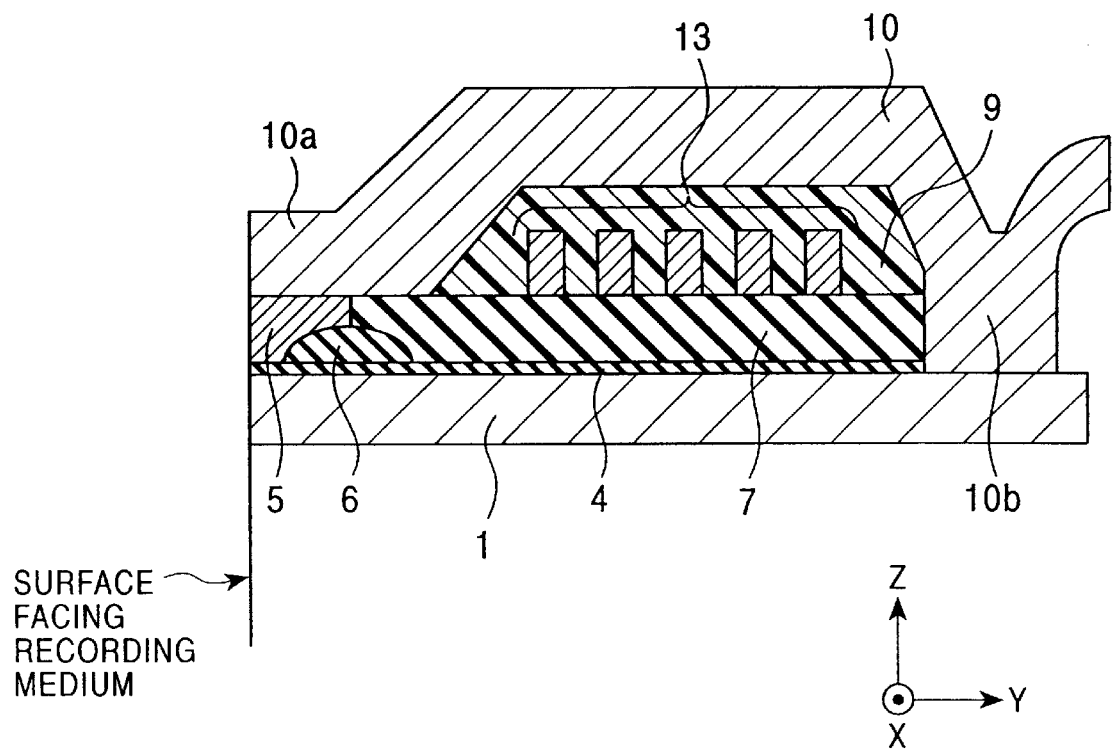
FIG. 25 is a partial cross-sectional view of the thin film magnetic head shown in FIG. 24.
Figure 26:
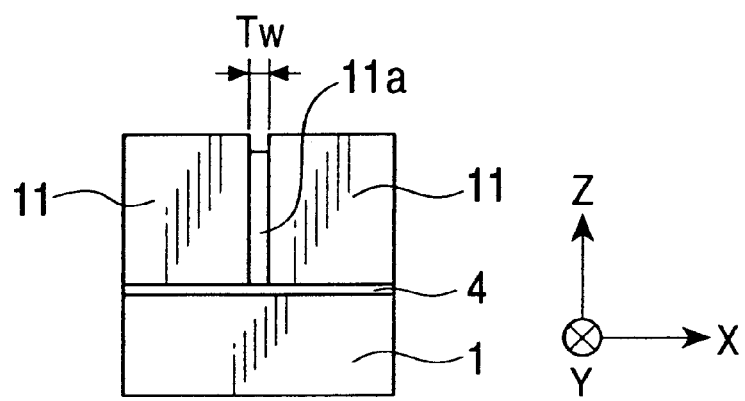
FIG. 26 is a partial front view showing the method of manufacturing a conventional thin film magnetic head.
Figure 27:
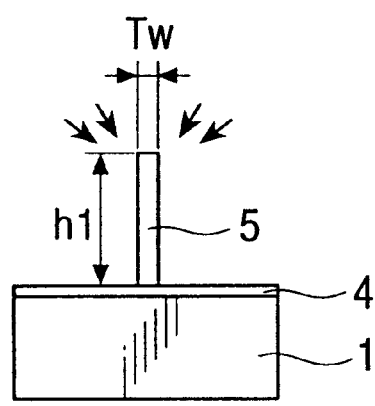
FIG. 27 is a partial front view showing the step after the step shown in FIG. 26.
Figure 28:
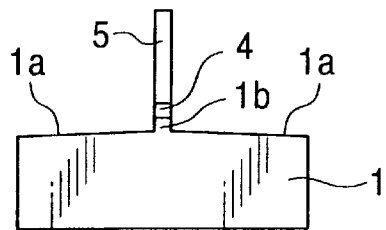
FIG. 28 is a partial front view showing the step after the step shown in FIG. 27.
Figure 29:
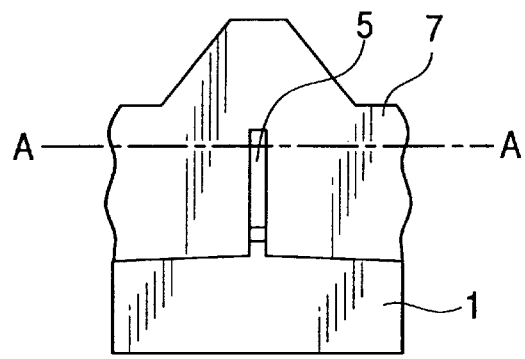
FIG. 29 is a partial front view showing the step after the step shown in FIG. 28.
Figure 30:
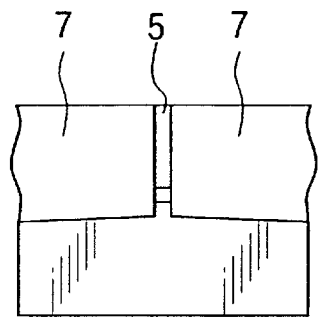
FIG. 30 is a partial front view showing the step after the step shown in FIG. 29.
Figure 31:
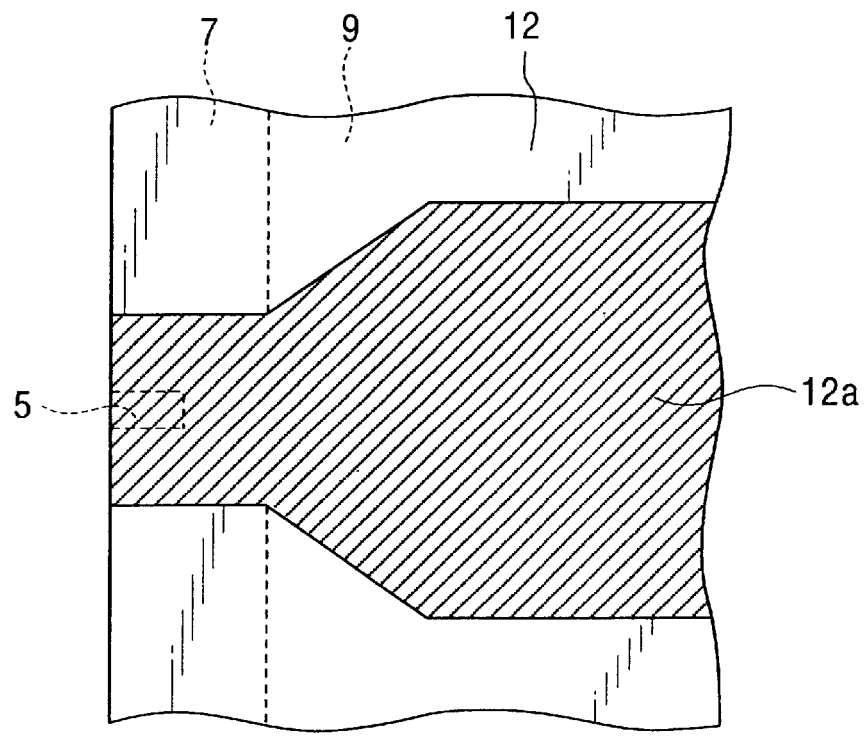
FIG. 31 is a partial plan view showing the step after the step shown in FIG. 30.
Figure 32:
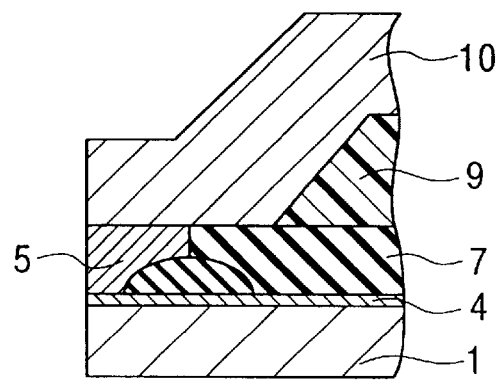
FIG. 32 is a partial cross-sectional view showing the step after the step shown in FIG. 31.

Where, as shown in FIG. 22, the remaining portion 41*d*1 of the resist layer 41 has the back surface 41*d*2 which is formed in an inclined surface or a curved surface inclined in the direction reverse to the height direction (the Y direction shown in the drawing) from the lower core layer side to the upper core layer side, the front surface 26*c* of the upper core layer 26 can be formed in an inclined surface or curved surface by plating the magnetic material used as the material for the upper core layer 26 in the pattern 41*a* so that the thickness of the upper core layer 26 gradually increases in the direction reverse to the height direction, as shown in FIG. 23.

In the thin film magnetic head shown in FIG. 23, in forming the protecting layer 34 made of $Al_2O_3$ or the like in the space B between the front surface 26*c* of the upper core layer and the face surface, the space B cannot be easily completely filled with the protecting layer 34, thereby easily forming a cavity in the space B. Therefore, in the present invention, the portion 41*d* of the resist layer 41 other than the pattern 41*a* thereof corresponding to the upper core layer 26 is irradiated with light and then developed to remove the portion of the pattern 41*a* having the front surface formed in an inclined or curved surface gradually retreating in the height direction as it approaches the top thereof in the step shown in FIG. 19. As a result, the front surface 26c of the upper core layer 26 is formed in an inclined surface or curved surface so that the thickness of the upper core layer gradually increases in the height direction.

FIGS. 15 to 21 show the steps of the method of manufacturing the thin film magnetic head in which the upper core layer 26 is located behind the surface facing the recording medium in the height direction. The front surface 26c of the upper core layer 26 is formed in an inclined surface or curved surface so that the thickness of the upper core layer gradually increases in the height direction, and in a curved surface so that the front end surface 26c gradually retreats in the height direction as it approaches both sides thereof in the track width direction. However, the method of manufacturing the thin film magnetic head according to another embodiment of the present invention is as follows.

In each of the examples shown in FIGS. 5 and 6, the upper core layer 26 is located behind the face surface in the height direction (the Y direction), and the front surface 26c of the upper core layer 26 is an inclined surface or curved surface so that the thickness of the upper core layer gradually increases in the height direction. However, the front surface 26c is formed in a planar shape in the track width direction, not in a curved surface in the track width direction (the X direction).

In this embodiment, in the step shown in FIG. 19, a pattern having the same shape as the upper core layer 26 shown in FIG. 5 or 6 is formed in the resist layer 41, and the portion other than the pattern is irradiated with light and then developed to remove the portion of the pattern having the front surface which is an inclined surface of curved surface gradually retreating in the height direction as the front surface approaches the top thereof. At this time, the front surface is formed at a position behind the formation position of the face surface in the height direction. Then, the magnetic material used as the material for the upper core layer 26 is plated in the pattern to form the upper core layer having the shape shown in FIG. 5 or 6.

In the embodiment shown in FIGS. 7 to 10, the front surface 26c of the upper core layer 26 is located at the face surface, and is an inclined surface or curved surface so that the thickness of the upper core layer gradually increases in the height direction, or the front surface 26c is a curved surface gradually retreating in the height direction as it approaches both sides in the track width direction.

In this case, in the step shown in FIG. 19, a pattern having the same shape as the upper core layer 26 shown in FIG. 9 or 10 is formed in the resist layer 41, and the portion other than the pattern is irradiated with light and then developed to remove the portion of the pattern having the front surface which is an inclined surface of curved surface gradually retreating in the height direction as the front surface approaches the top thereof. At this time, the front surface is formed at the same position as the formation position of the face surface. Then, the magnetic material used as the material for the upper core layer 26 is plated in the pattern to form the upper core layer having the shape shown in FIG. 9 or 10.

In the embodiment shown in FIGS. 11 to 14, the front surface 26c of the upper core layer 26 is located at the face surface, and is a curved surface gradually retreating in the height direction as it approaches both sides in the track width direction. However, the front surface 26c is formed along the face surface, not in an inclined surface or curved surface so that the thickness of the upper core layer increases in the height direction.

In this case, in the step shown in FIG. 19, a pattern having the same shape as the upper core layer 26 shown in FIG. 13 or 14, is formed in the resist layer 41 by exposure and development. In the exposure and development, either the portion of the pattern or the portion other than the pattern may be irradiated with light. Since the front surface 26c is not an inclined surface or curved surface so that the thickness of the upper core layer 26 increases in the height direction, either the portion of the pattern corresponding to the upper core layer 26 or the portion other than the pattern may be irradiated in exposure and development.

After the pattern of the upper core layer 26 is formed by exposure and development, the magnetic material used as the material for the upper core layer 26 is plated in the pattern to form the upper core layer having the shape shown in FIG. 13 or 14.

As described above, in the manufacturing method of the present invention, the recording core 24 for regulating the track width Tw, which comprises the three layer film comprising the lower pole layer 21, the gap layer 22 and the upper pole layer 35, or the two layer film comprising the gap layer 22 and the upper pole layer 35, can be formed by continuous plating. Therefore, unlike the conventional method, the trimming step comprising ion irradiation at an angle close to a right angle of the film plane of the lower core layer 20 need not be performed, thereby permitting the manufacture of a thin film magnetic head with high reproducibility.

Also, in the method of manufacturing the thin film magnetic head of the present invention, in the resist layer used for patterning the upper core layer, the portion other than the pattern of the upper core layer is irradiated with light, and then developed so that the front surface of the pattern can be formed in an inclined surface or curved surface gradually retreating in the height direction as it approaches the top thereof. Therefore, the front surface 26c of the upper core layer 26 can be formed in an inclined surface or curved surface so that the thickness of the upper core layer 26 increases in the height direction.

Although, in FIGS. 15 to 18, the recording core 24 is first formed on the lower core layer 20, and then the peripheral region of the recording core 24 is filled with the insulation layer 30, the present invention is not limited to this method. For example, another method may be used, in which the insulation layer 30 is first formed on the lower core layer 20, a trench is formed in the insulation layer 30, and then the recording core 24 is formed in the trench.

As described in detail above, in the present invention, the front surface of an upper core layer is formed in a curved surface so that it gradually retreats in the height direction as it approaches both sides in the track width direction, thereby suppressing the occurrence of side fringing.

The front surface of the upper core layer may be formed at the position of the face surface, or a position behind the face surface in the height direction.

In the present invention, when the front surface is formed to extend to the face surface, the front surface is preferably an inclined surface or curved surface so that the thickness of the upper core layer increases in the height direction. As a result, a thin film magnetic head adaptable to a higher recording density can be manufactured, in which the occurrence of side fringing can be further suppressed, and a magnetic flux from the upper core layer can be efficiently caused to flow to the upper pole layer.

The manufacturing method of the invention can manufacture a thin film magnetic head suitable for suppressing the occurrence of side fringing without the trimming step comprising ion irradiation at an angle close to a right angle with the film plane of the lower core layer, and can thus manufacture a thin film magnetic head with high reproducibility. In exposure and development of a resist layer necessary for forming the upper core layer, the portion of the resist layer other than a pattern thereof corresponding to the upper core layer is irradiated with light so that the front surface of the upper core layer can easily be formed as an inclined surface or curved surface so that the thickness of the upper core layer increases in the height direction.

What is claimed is:

1. A thin film magnetic head comprising:
   a lower core layer;
   a recording core exposed at a face surface facing a recording medium and comprising a lower pole layer, a gap layer and an upper pole layer which are sequentially laminated in turn on the lower core layer;
   an upper core layer magnetically connected to the upper pole layer of the recording core; and
   a coil for inducing a recording magnetic field in the lower core layer, the recording core and the upper core layer;
   wherein a front surface of the upper core layer facing the recording medium is a curved surface which gradually retreats in a height direction, wherein the height direction is a direction that is generally perpendicular to the face surface as it approaches side surfaces of the upper core layer that are displaced away from one another in a track width direction, wherein the track width direction is a direction that is generally parallel to the face surface, wherein the front surface of the upper core layer is one of an inclined surface or a curved surface so that the thickness of the upper core layer gradually increases in the height direction, and
   wherein a line tangent to terminating points of the curved surface in the track width direction has an inclination angle of about 30° to about 60° with respect to the track width direction.

2. A thin film magnetic head according to claim 1, wherein the front surface of the upper core layer is displaced away from the face surface in the height direction.

3. A thin film magnetic head according to claim 2, wherein a minimum distance L3 from the face surface to the front surface of the upper core layer is smaller than a maximum length dimension of the recording core from the face surface in the height direction.

4. A thin film magnetic head according to claim 3, wherein the distance L3 has a range from about 0 μm up to and including about 0.8 μm.

5. A thin film magnetic head according to claim 1, wherein a width dimension in the track width direction of an end of the upper core layer that is connected to the upper pole is larger than a width dimension of the upper pole layer in the track width direction.

6. A thin film magnetic head according to claim 1, wherein the gap layer comprises a nonmagnetic metal material which can be plated.

7. A thin film magnetic head according to claim 6, wherein the nonmagnetic metal material comprises at least one material selected from NiP, NiPd, NiW, NiMo, Au, Pt, Rh, Pd, Ru, and Cr.

8. A thin film magnetic head comprising:
   a lower core layer;
   a recording core exposed at a face surface facing a recording medium and comprising a lower pole layer, a gap layer and an upper pole layer which are sequentially laminated in turn on the lower core layer;
   an upper core layer magnetically connected to the upper pole layer of the recording core; and
   a coil for inducing a recording magnetic field in the lower core layer, the recording core and the upper core layer;
   wherein a front surface of the upper core layer facing the recording medium is a curved surface which gradually retreats in a height direction, wherein the height direction is a direction that is generally perpendicular to the face surface as it approaches side surfaces of the upper core layer that are displaced away from one another in a track width direction, wherein the track width direction is a direction that is generally parallel to the face surface,
   wherein the upper core layer comprises a front region which extends from terminating points of the curve surface in the height direction, and which has a constant width dimension in the track width direction, and a back region which has a width dimension in the track width direction that gradually increases in the height direction and which starts from the terminal of the front end region in the height direction.

9. A thin film magnetic head according to claim 8, wherein the front surface of the upper core layer is displaced away from the face surface in the height direction.

10. A thin film magnetic head according to claim 9, wherein a minimum distance L3 from the face surface to the front surface of the upper core layer is smaller than a maximum length dimension of the recording core from the face surface in the height direction.

11. A thin film magnetic head according to claim 10, wherein the distance L3 has a range from about 0 μm up to and including about 0.8 μm.

12. A thin film magnetic head according to claim 8, wherein the front surface of the upper core layer is one of an inclined surface or a curved surface so that the thickness of the upper core layer gradually increases in the height direction.

13. A thin film magnetic head according to claims 8, wherein a width dimension in the track width direction of an end of the upper core layer that is connected to the upper pole layer is larger than a width dimension of the upper pole layer in the track width direction.

14. A thin film magnetic head according to claim 8, wherein the gap layer comprises a nonmagnetic metal material which can be plated.

15. A thin film magnetic head according to claim 14, wherein the nonmagnetic metal material comprises at least one material selected from NiP, NiPd, NiW, NiMo, Au, Pt, Rh, Pd, Ru, and Cr.

16. A thin film magnetic head comprising:
   a lower core layer;
   a recording core exposed at a face surface facing a recording medium and comprising a lower pole layer, a gap layer and an upper pole layer which are sequentially laminated in turn on the lower core layer;
   an upper core layer magnetically connected to the upper pole layer of the recording core; and
   a coil for inducing a recording magnetic field in the lower core layer, the recording core and the upper core layer,
   wherein a front surface of the upper core layer facing the recording medium is a curved surface which gradually retreats in a height direction, wherein the height direction is a direction that is generally perpendicular to the face surface as it approaches side surfaces of the upper core layer that are displaced away from one another in a track width direction, wherein the track width direction is a direction that is generally parallel to the face surface, wherein the front surface of the upper core layer is one of an inclined surface or a curved surface so that the thickness of the upper core layer gradually increases in the height direction, wherein the upper core layer has a back surface which is located at a position behind the front surface in the height direction, and which is one of a curved surface or an inclined surface so that the distance between the lower core layer and the upper core layer gradually increases in the height direction; and wherein θ1 is one of an inclination angle of the inclined surface formed at the back surface with respect to the height direction, or an inclination angle of a line tangent to the curved surface at an intermediate point between a terminating point at the recording core and a terminating point on an underside of the upper core layer with respect to the height direction; and wherein θ2 is one of an inclination angle of the inclined surface at the front surface of the upper core layer with respect to the height direction, or the inclination angle of a line tangent to the curved surface at an intermediate point between a terminating point at the recording core and a terminating point at an underside of the upper core layer with the height direction; and wherein θ2 is larger than θ1.

17. A thin film magnetic head according to claim 16, wherein the inclination angle θ2 is about 60°≦θ2<about 90°.

18. A thin film magnetic head according to claim 16, wherein the front surface of the upper core layer is displaced away from the face surface in the height direction.

19. A thin film magnetic head according to claim 18, wherein a minimum distance L3 from the face surface to the front surface of the upper core layer is smaller than a maximum length dimension of the recording core from the face surface in the height direction.

20. A thin film magnetic head according to claim 19, wherein the distance L3 has a range from about 0 μm up to and including about 0.8 μm.

21. A thin film magnetic head according to claim 16, wherein the front surface of the upper core layer is one of an inclined surface or a curved surface so that the thickness of the upper core layer gradually increases in the height direction.

22. A thin film magnetic head according claim 16, wherein a width dimension in the track width direction of an end of the upper core layer that is connected to the upper pole layer is larger than a width dimension of the upper pole layer in the track width direction.

23. A thin film magnetic head according to claim 16, wherein the gap layer comprises a nonmagnetic metal material which can be plated.

24. A thin film magnetic head according to claim 23, wherein the nonmagnetic metal material comprises at least one material selected from NiP, NiPd, NiW, NiMo, Au, Pt, Rh, Pd, Ru, and Cr.

* * * * *

UNITED STATES PATENT AND TRADEMARK OFFICE
CERTIFICATE OF CORRECTION

PATENT NO. : 6,768,611 B2
DATED : July 27, 2004
INVENTOR(S) : Kiyoshi Sato et al.

It is certified that error appears in the above-identified patent and that said Letters Patent is hereby corrected as shown below:

<u>Title page,</u>
Item [*] Notice, "Subject to any disclaimer, the term of this patent is extended or adjusted under 35 U.S.C. 154(b) by 129 days." should read -- Subject to any disclaimer, the term of this patent is extended or adjusted under 35 U.S.C. 154(b) by 16 days. --.

Signed and Sealed this

Eighteenth Day of October, 2005

JON W. DUDAS
*Director of the United States Patent and Trademark Office*